US008229877B2

(12) United States Patent
Sugihara et al.

(10) Patent No.: US 8,229,877 B2
(45) Date of Patent: Jul. 24, 2012

(54) INFORMATION PROCESSING SYSTEM, INFORMATION PROCESSING METHOD, AND COMPUTER PROGRAM PRODUCT

(75) Inventors: Ryohei Sugihara, Machida (JP); Seiji Tatsuta, Hachioji (JP); Yoichi Iba, Hachioji (JP)

(73) Assignee: Olympus Corporation, Tokyo (JP)

( * ) Notice: Subject to any disclaimer, the term of this patent is extended or adjusted under 35 U.S.C. 154(b) by 544 days.

(21) Appl. No.: 12/561,725

(22) Filed: Sep. 17, 2009

(65) Prior Publication Data

US 2010/0070456 A1 Mar. 18, 2010

(30) Foreign Application Priority Data

Sep. 17, 2008 (JP) .................................. 2008-237930

(51) Int. Cl.
 G06F 17/00 (2006.01)
 G06N 5/02 (2006.01)
(52) U.S. Cl. ......................................................... 706/54

(58) Field of Classification Search ....................... 706/54
See application file for complete search history.

(56) References Cited

FOREIGN PATENT DOCUMENTS

| JP | 2000-099858 | 4/2000 |
|---|---|---|
| JP | 2006-293535 | 10/2006 |

*Primary Examiner* — Michael B Holmes
(74) *Attorney, Agent, or Firm* — Scully, Scott, Murphy & Presser, P.C.

(57) ABSTRACT

An information processing system includes a state estimation section that estimates a state of a user based on information that includes sensor information from at least one of a behavior sensor that measures a behavior of the user, a condition sensor that measures a condition of the user, and an environment sensor that measures an environment of the user, a historical information storage section that stores state historical information about the user, a usualness level evaluation section that evaluates a usualness level of the user, and a write section that writes the usualness level of the user evaluated by the usualness level evaluation section in the historical information storage section so that the usualness level is linked to each state of the user indicated by the state historical information about the user.

23 Claims, 27 Drawing Sheets

FIG. 4

| DATE | TIME | LATITUDE AND LONGITUDE | PLACE | USUALNESS LEVEL |
|---|---|---|---|---|
| 2007.10.7 (SUN) | 8:△△ | 35.73.XXXX, 139.76.XXXX | HOME | 10 |
| 2007.10.7 (SUN) | 9:△△ | 35.70.XXXX, 139.80.XXXX | ASAKUSA | 6 |
| 2007.10.7 (SUN) | 12:△△ | 35.75.XXXX, 139.60.XXXX | NIKKO TOSHOGU SHRINE | 2 |
| ...... | ...... | ...... | ...... | |
| 2007.10.10 (WED) | 8:△△ | 35.73.XXXX, 139.76.XXXX | HOME | 10 |
| 2007.10.10 (WED) | 10:△△ | 35.68.XXXX, 139.70.XXXX | ** BUILDING, SHINJUKU | 10 |
| 2007.10.10 (WED) | 12:△△ | 35.67.XXXX, 139.71.XXXX | ** RESTAURANT, SHINJUKU | 6 |
| 2007.10.10 (WED) | 20:△△ | 35.69.XXXX, 139.69.XXXX | ** HOTEL, SHINJUKU | 3 |
| ...... | | | ...... | |

FIG. 16A

TOTAL USUALNESS LEVEL TN=F
(TIME, PLACE, BEHAVIOR, CONDITION, AND SCHEDULE)

USUALNESS SUBLEVEL SN1=F (TIME AND PLACE)

USUALNESS SUBLEVEL SN2=F (TIME AND SCHEDULE)

USUALNESS SUBLEVEL SN3=F (TIME AND BEHAVIOR)

USUALNESS SUBLEVEL SN4=F (PLACE AND BEHAVIOR)

USUALNESS SUBLEVEL SN5=F (TIME, PLACE, AND BEHAVIOR)

USUALNESS SUBLEVEL SN6=F (TIME, PLACE, AND SCHEDULE)

FIG. 16B

TABLE FOR USUALNESS SUBLEVEL SN1

| TIME AND PLACE | USUALNESS LEVEL | CONTENT |
|---|---|---|
| J1 | N1 | CA11 |
| J1 | N2 | CA12 |
| J2 | N1 | CA21 |
| ⋮ | ⋮ | ⋮ |

TABLE FOR USUALNESS SUBLEVEL SN2

| TIME AND SCHEDULE | USUALNESS LEVEL | CONTENT |
|---|---|---|
| J1 | N1 | CB11 |
| J1 | N2 | CB12 |
| J2 | N1 | CB21 |
| ⋮ | ⋮ | ⋮ |

FIG. 18A AREA
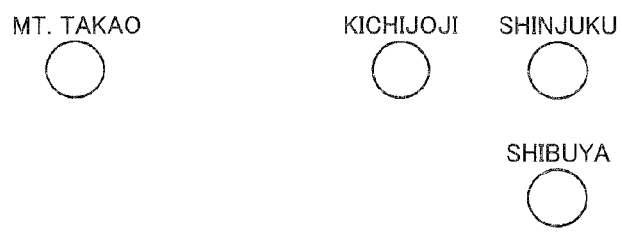
FIG. 18B SPOT
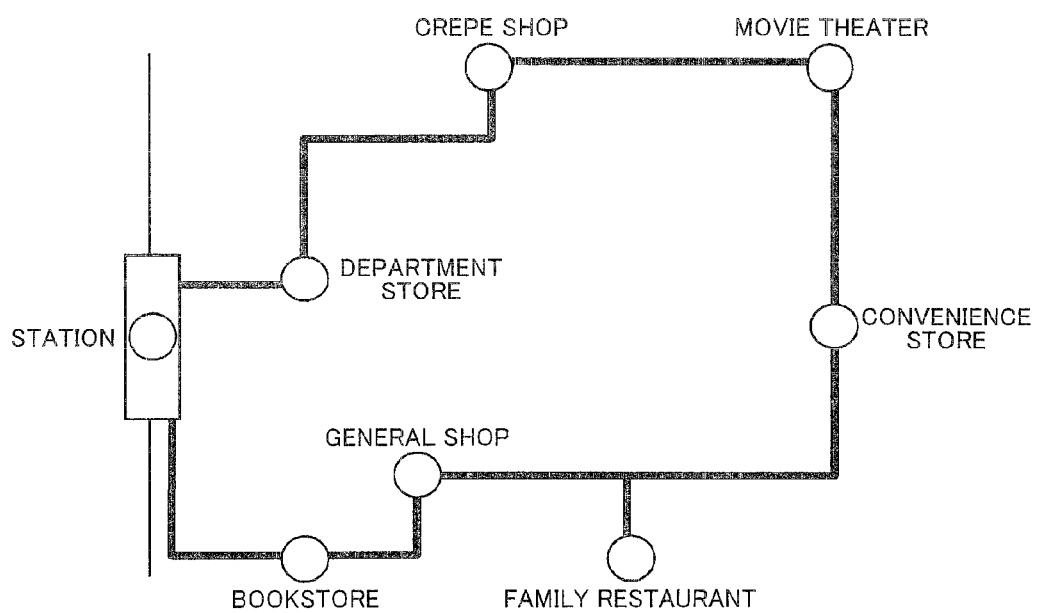

FIG. 22

| AREA | SPOT | CUMULATIVE STAY TIME WITHIN ONE MONTH[H] | | | | CUMULATIVE STAY TIME WITHIN ONE MONTH[%] | | | |
|---|---|---|---|---|---|---|---|---|---|
| | | DAYTIME ON WEEKDAY | MORNING AND NIGHT ON WEEKDAY | DAYTIME ON HOLIDAY | MORNING AND NIGHT ON HOLIDAY | DAYTIME ON WEEKDAY | MORNING AND NIGHT ON WEEKDAY | DAYTIME ON HOLIDAY | MORNING AND NIGHT ON HOLIDAY |
| MINAMINO | HOME | 0.0 | 190.0 | 40.0 | 80.0 | 0% | 72% | 42% | 83% |
| MINAMINO | SUPERMARKET ** | 0.0 | 0.0 | 10.0 | 0.0 | 0% | 0% | 10% | 0% |
| MINAMINO | ** BOOKSTORE | 0.0 | 0.0 | 4.0 | 0.0 | 0% | 0% | 4% | 0% |
| ....... | ....... | | | | | | | | |
| SHINJUKU | OFFICE | 221.5 | 22.0 | 0.0 | 0.0 | 84% | 8% | 0% | 0% |
| SHINJUKU | SMALL RESTAURANT ** | 0.0 | 7.5 | 0.0 | 0.0 | 0% | 3% | 0% | 0% |
| SHINJUKU | TAVERN ** | 0.0 | 13.0 | 0.0 | 0.0 | 0% | 5% | 0% | 0% |
| SHINJUKU | ** DEPARTMENT STORE | 0.0 | 0.0 | 3.0 | 0.0 | 0% | 0% | 3% | 0% |
| SHINJUKU | ** MUSEUM | 0.0 | 0.0 | 4.5 | 0.0 | 0% | 0% | 5% | 0% |
| ....... | ....... | | | | | | | | |
| TACHIKAWA | ** MOVIE THEATER | 0.0 | 0.0 | 2.5 | 0.0 | 0% | 0% | 3% | 0% |
| TACHIKAWA | ** DEPARTMENT STORE | 0.0 | 0.0 | 4.0 | 0.0 | 0% | 0% | 4% | 0% |
| ....... | ....... | | | | | | | | |
| MT. TAKAO | — | 0.0 | 0.0 | 6.0 | 0.0 | 0% | 0% | 6% | 0% |
| TOKORO-ZAWA | PARENTS' HOME | 0.0 | 0.0 | 12.5 | 10.0 | 0% | 0% | 13% | 10% |
| ....... | ....... | | | | | | | | |
| MACHIDA | ** WEAR | 0.0 | 0.0 | 1.0 | 0.0 | 0% | 0% | 1% | 0% |
| MACHIDA | ** DOUGHNUT | 0.0 | 0.0 | 0.5 | 0.0 | 0% | 0% | 1% | 0% |
| ....... | ....... | | | | | | | | |

FIG. 23A

| PROBABILITY | USUALNESS LEVEL N (VALUE USED TO CALCULATE USUALNESS LEVEL) |
|---|---|
| LESS THAN 0.5% | 1 |
| LESS THAN 1% | 2 |
| LESS THAN 2% | 3 |
| LESS THAN 3% | 4 |
| LESS THAN 5% | 5 |
| LESS THAN 7% | 6 |
| LESS THAN 10% | 7 |
| LESS THAN 13% | 8 |
| LESS THAN 17% | 9 |
| 17% OR MORE | 10 |

FIG. 23B

| NUMBER OF TIMES WITHIN GIVEN PERIOD | USUALNESS LEVEL N |
|---|---|
| LESS THAN 1 | 1 |
| LESS THAN 2 | 2 |
| LESS THAN 4 | 3 |
| LESS THAN 7 | 4 |
| LESS THAN 11 | 5 |
| LESS THAN 16 | 6 |
| LESS THAN 22 | 7 |
| LESS THAN 30 | 8 |
| LESS THAN 42 | 9 |
| 60 OR MORE | 10 |

INFORMATION PROCESSING SYSTEM, INFORMATION PROCESSING METHOD, AND COMPUTER PROGRAM PRODUCT

Japanese Patent Application No. 2008-237930 filed on Sep. 17, 2008, is hereby incorporated by reference in its entirety.

BACKGROUND

The present invention relates to an information processing system, an information processing method, a computer program product, and the like.

As a ubiquitous service, a convenience provision service that aims at providing the user with necessary information anywhere and anytime has been proposed. The convenience provision service unilaterally provides information to the user from the outside.

However, the convenience provision service which unilaterally provides information to the user from the outside is insufficient for a person to enjoy an active and full life. Therefore, it is desirable to provide an inspiring ubiquitous service that inspires the user to aware of something by appealing to the user's mind to promote personal growth of the user.

A related-art information processing system has a problem in that information necessary for the user cannot be presented to the user unless the user intentionally acquires the information (i.e., push information presentation cannot be implemented).

An information processing system disclosed in JP-A-2006-293535 has been known as a system that solves the above problem. This system implements push information presentation by estimating the behavior of the user using a wearable sensor, and displaying information corresponding to the behavior of the user.

The system disclosed in JP-A-2006-293535 can present clearly necessary information to the user as push information without requiring an operation of the user, but cannot present potentially necessary information to the user. Providing only clearly necessary information to the user enhances convenience, but merely supports the extension of the usual life pattern. The user does not become aware of something from only the patterned life and behavior so that the user may not enjoy a full life. On the other hand, an unusual new experience involves complexity and uneasiness.

Therefore, it is desirable to implement an information processing system that can prompt the user to change the usual life pattern, and allows the user to appropriately balance usual behavior and unusual behavior in his daily life by allowing the user to easily have an unusual experience.

JP-A-2000-99858 discloses a system that monitors abnormal behavior of a solitary old person. This system aims at automatically detecting and indicating a situation in which a solitary old person has become incapacitated, but does not aim at an inspiring ubiquitous service that inspires the user to be aware of something to promote personal growth of the user.

SUMMARY

According to one aspect of the invention, there is provided an information processing system comprising:

a state estimation section that estimates a state of a user based on information that includes sensor information from at least one of a behavior sensor that measures a behavior of the user, a condition sensor that measures a condition of the user, and an environment sensor that measures an environment of the user;

a historical information storage section that stores state historical information about the user;

a usualness level evaluation section that evaluates a usualness level of the user; and a write section that writes the usualness level of the user evaluated by the usualness level evaluation section in the historical information storage section so that the usualness level is linked to each state of the user indicated by the state historical information about the user.

According to another aspect of the invention, there is provided an information processing system comprising:

a state estimation section that estimates a state of a user based on information that includes sensor information from at least one of a behavior sensor that measures a behavior of the user, a condition sensor that measures a condition of the user, and an environment sensor that measures an environment of the user;

a usualness level evaluation section that evaluates a usualness level of the user;

a content information storage section that stores a plurality of contents; and a content selection section that selects a content presented to the user from the plurality of contents stored in the content information storage section based on the state of the user and the usualness level of the user.

According to another aspect of the invention, there is provided an information processing method comprising:

estimating a state of a user based on information that includes sensor information from at least one of a behavior sensor that measures a behavior of the user, a condition sensor that measures a condition of the user, and an environment sensor that measures an environment of the user;

storing state historical information about the user in a historical information storage section;

evaluating a usualness level of the user; and writing the usualness level of the user obtained by the evaluation in the historical information storage section so that the usualness level is linked to each state of the user indicated by the state historical information about the user.

According to another aspect of the invention, there is provided an information processing method comprising:

estimating a state of a user based on information that includes sensor information from at least one of a behavior sensor that measures a behavior of the user, a condition sensor that measures a condition of the user, and an environment sensor that measures an environment of the user;

evaluating a usualness level of the user;

storing a plurality of contents in a content information storage section; and selecting a content presented to the user from the plurality of contents stored in the content information storage section based on the state of the user and the usualness level of the user.

According to another aspect of the invention, there is provided a computer program product storing a program code that causes a computer to execute the above information processing method.

BRIEF DESCRIPTION OF THE DRAWINGS

FIG. 4 shows an example of the data structure of a historical information storage section.

FIG. 8 is a view illustrative of a method that presents a content based on the future state of the user and the usualness level.

FIGS. 16A and 16B are views illustrative of a usualness sublevel.

FIGS. 18A and 18B are views illustrative of an area and a spot.

FIG. 22 is a view illustrative of the probability that the user stays in each place.

FIGS. 23A and 23B are views illustrative of a method of calculating the usualness level based on the probability or the number of times that the user was present in a place.

DESCRIPTION OF EXEMPLARY EMBODIMENTS

Figure 1:
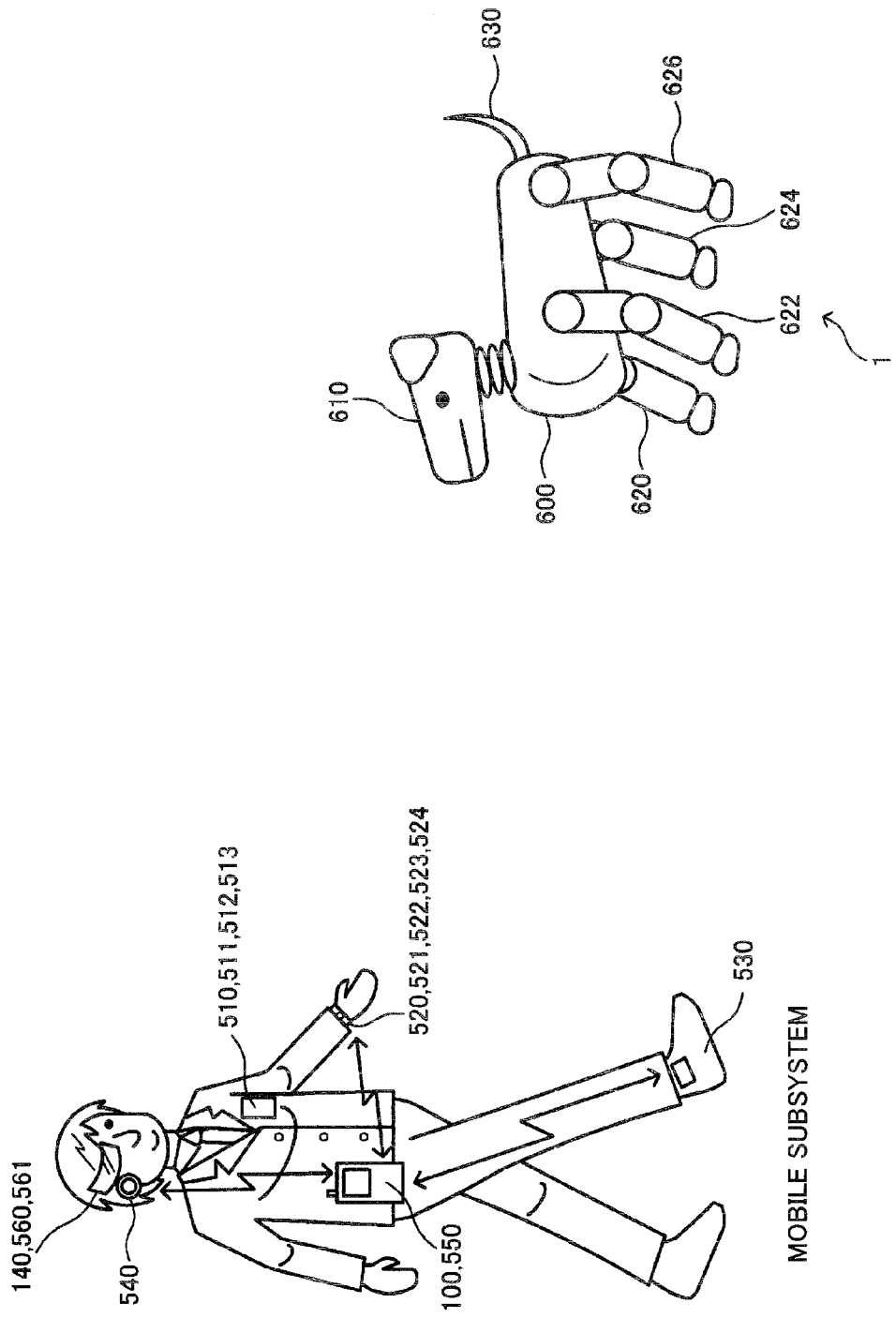
FIG. 1 is a view illustrative of a method of acquiring sensor information.

Several aspects of the invention may provide an information processing system, an information processing method, a computer program product and the like that enable information processing and information presentation utilizing the usualness level of the user.

According to one embodiment of the invention, there is provided an information processing system comprising:

a state estimation section that estimates a state of a user based on information that includes sensor information from at least one of a behavior sensor that measures a behavior of the user, a condition sensor that measures a condition of the user, and an environment sensor that measures an environment of the user;

a historical information storage section that stores state historical information about the user;

a usualness level evaluation section that evaluates a usualness level of the user; and a write section that writes the usualness level of the user evaluated by the usualness level evaluation section in the historical information storage section so that the usualness level is linked to each state of the user indicated by the state historical information about the user.

According to this embodiment, the sensor information from at least one of the behavior sensor, the condition sensor, and the environment sensor is acquired, and the state of the user is estimated based on the information including the acquired sensor information. The state historical information about the user is stored in the historical information storage section. The usualness level of the user is evaluated, and written into the historical information storage section so that the usualness level is linked to each state of the user indicated by the state historical information about the user. Therefore, various types of information processing and information presentation utilizing the usualness level of the user can be performed by merely reading the usualness level linked to each state of the user indicated by the state historical information from the historical information storage section.

The information processing system may further comprise:

a content information storage section that stores a plurality of contents; and a content selection section that selects a content presented to the user from the plurality of contents stored in the content information storage section based on the usualness level of the user linked to each state of the user indicated by the state historical information about the user.

According to this configuration, the content can be selected and presented to the user using the usualness level of the user linked to each state of the user indicated by the state historical information about the user.

In the information processing system, the content selection section may preferentially extract the state of the user that is linked to a low usualness level from the state historical information stored in the historical information storage section, and may select the content that corresponds to the extracted state of the user.

According to this configuration, an event during an unusual experience with a low usualness level can be preferentially extracted, and the content corresponding to the event can be presented to the user.

In the information processing system, the content selection section may preferentially extract the state of the user that is linked to a high usualness level from the state historical information stored in the historical information storage section, and may select the content that corresponds to the extracted state of the user.

According to this configuration, a content that prompts the user to become aware that the behavior or the like is in a rut (i.e., high usualness level) and change the behavior or the like can be presented.

According to another embodiment of the invention, there is provided an information processing system comprising:

a state estimation section that estimates a state of a user based on information that includes sensor information from at least one of a behavior sensor that measures a behavior of the user, a condition sensor that measures a condition of the user, and an environment sensor that measures an environment of the user;

a usualness level evaluation section that evaluates a usualness level of the user;

a content information storage section that stores a plurality of contents; and a content selection section that selects a content presented to the user from the plurality of contents stored in the content information storage section based on the state of the user and the usualness level of the user.

According to this embodiment, the sensor information from at least one of the behavior sensor, the condition sensor, and the environment sensor is acquired, and the state of the user is estimated based on the information including the acquired sensor information. The usualness level of the user is also evaluated. The content is selected based on the state of the user and the usualness level of the user. Therefore, an optimum content corresponding to the state of the user and the usualness level of the user can be selected and presented to the user to implement information presentation utilizing the usualness level of the user.

In the information processing system, the state estimation section may predict a future state of the user based on schedule information about the user;

the usualness level evaluation section may evaluate the usualness level of user with respect to the predicted future state of the user; and the content selection section may select the content presented to the user based on the usualness level of user with respect to the future state of the user.

According to this configuration, an optimum content corresponding to the usualness level of the future state of the user can be selected and presented to the user.

The information processing system may further comprise:

a presentation control section that causes a robot to present the content selected by the content selection section to the user.

According to this configuration, the content selected corresponding to the usualness level of the user can be presented to the user by utilizing the robot.

In the information processing system, the content information storage section may store scenario data that includes a plurality of phrases as the content presented to the user; and the presentation control section may cause the robot to speak a phrase included in the scenario data selected as the content.

According to this configuration, the speech of the robot corresponding to the usualness level of the user and the like can be implemented by a simple control process by utilizing the scenario data.

The information processing system may further comprise:

a presentation control section that presents the content selected by the content selection section to the user using a digital photo frame.

According to this configuration, the content selected by utilizing the usualness level of the user can be presented to the user using the digital photo frame.

The information processing system may further comprise:

a presentation control section that presents the content selected by the content selection section to the user using a wearable display.

According to this configuration, the content selected by utilizing the usualness level of the user can be presented to the user using the wearable display in a mobile environment.

In the information processing system, the usualness level evaluation section may evaluate a first usualness sublevel that is a usualness level evaluated based on a first evaluation target item, and may evaluate a second usualness sublevel that is a usualness level evaluated based on a second evaluation target item that differs from the first evaluation target item, and the content selection section may select a content corresponding to the first evaluation target item when selecting a content based on the first usualness sublevel, and may select a content corresponding to the second evaluation target item when selecting a content based on the second usualness sublevel.

According to this configuration, an appropriate content corresponding to the state of the user and the usualness level can be selected by appropriately selecting the usualness sublevel when selecting the content.

In the information processing system, the first evaluation target item and the second evaluation target item may include at least one of time information, place information about the user, behavior information about the user, condition information about the user, and schedule information about the user.

According to this configuration, the content can be selected by evaluating the first usualness level and the second usualness level using the first evaluation target item and the second evaluation target item that differ from each other and include at least one of the time information, the place information, the behavior information, the condition information, and the schedule information.

In the information processing system, the state estimation section may specify a place of stay of the user;

the usualness level evaluation section may evaluate the usualness level of the user with respect to the place of stay of the user; and the content selection section may select the content based on the usualness level of the user with respect to the place of stay of the user.

According to this configuration, the usualness level can be evaluated corresponding to the place of stay of the user, and the content can be selected based on the resulting usualness level. Therefore, an appropriate content corresponding to the place of stay of the user can be presented.

In the information processing system, the state estimation section may determine whether the user stays within an area or a spot, the spot being smaller than the area, the usualness level evaluation section may evaluate the usualness level of the user with respect to the area when the state estimation section has determined that the user stays within the area, and may evaluate the usualness level of the user with respect to the spot when the state estimation section has determined that the user stays within the spot, and the content selection section may select the content based on the usualness level of the user with respect to the area when the state estimation section has determined that the user stays within the area, and may select the content based on the usualness level of the user with respect to the spot when the state estimation section has determined that the user stays within the spot.

According to this configuration, an area that has a different meaning for the user can be extracted as the area or the spot that is smaller than the area, and the content can be selected and presented to the user, for example. Therefore, an appropriate content corresponding to the place meaningful to the user can be presented.

In the information processing system, the content selection section may select the content preferentially based on the usualness level of the user with respect to the spot when the state estimation section has determined that the user stays within the spot within the area, and may select the content based on the usualness level of the user with respect to the area when the state estimation section has determined that the user stays within a place within the area other than the spot.

According to this configuration, when a spot has been specified, the content selected based on the usualness level of the user with respect to the spot can be preferentially presented to the user, and the content selected based on the usualness level of the user with respect to the area can be presented to the user when a spot has not been specified.

In the information processing system, the state estimation section may determine whether the user stays within the area or the spot based on a standard deviation of a position of the user within a given period.

According to this configuration, the place where the user stays can be specified as the area or spot (meaningful area) by a statistical process that determines the standard deviation of the position of the user within a given period.

In the information processing system, the state estimation section may determine whether or not the user stays within the area based on whether or not the standard deviation of the position of the user within the given period is equal to or less than a given first threshold value, and may determine whether or not the user stays within the spot based on whether or not the standard deviation of the position of the user within the given period is equal to or less than a given second threshold value, the given second threshold value being smaller than the first threshold value.

According to this configuration, an area (area or spot) meaningful to the user can be extracted by setting the first threshold value and the second threshold value.

In the information processing system, the usualness level evaluation section may evaluate the usualness level of the user based on the state of the user estimated by the state estimation section.

According to this configuration, the usualness level of the user can be evaluated corresponding to the state of the user estimated based on the information including the sensor information.

In the information processing system, the state estimation section may include a state identification section and a state prediction section; and the usualness level evaluation section may evaluate the usualness level of the user by comparing a state of the user predicted by the state prediction section with an actual state of the user identified by the state identification section.

According to this configuration, since the usualness level can be evaluated by detecting the difference between the predicted state of the user and the actual state of the user, the usualness level can be evaluated more appropriately.

According to another embodiment of the invention, there is provided an information processing method comprising:

estimating a state of a user based on information that includes sensor information from at least one of a behavior sensor that measures a behavior of the user, a condition sensor that measures a condition of the user, and an environment sensor that measures an environment of the user;

storing state historical information about the user in a historical information storage section;

evaluating a usualness level of the user; and writing the usualness level of the user obtained by the evaluation in the historical information storage section so that the usualness level is linked to each state of the user indicated by the state historical information about the user.

According to another embodiment of the invention, there is provided an information processing method comprising:

estimating a state of a user based on information that includes sensor information from at least one of a behavior sensor that measures a behavior of the user, a condition sensor that measures a condition of the user, and an environment sensor that measures an environment of the user;

evaluating a usualness level of the user;

storing a plurality of contents in a content information storage section; and selecting a content presented to the user from the plurality of contents stored in the content information storage section based on the state of the user and the usualness level of the user.

According to another embodiment of the invention, there is provided a computer program product storing a program code that causes a computer to execute the above information processing method.

The term "computer program product" refers to an information storage medium, a device, an instrument, a system, or the like that stores a program code, such as an information storage medium (e.g., optical disk medium (e.g., DVD), hard disk medium, and memory medium) that stores a program code, a computer that stores a program code, or an Internet system (e.g., a system including a server and a client terminal), for example. In this case, each element and each process according to the above embodiments are implemented by corresponding modules, and a program code that includes these modules is recorded in the computer program product.

Embodiments of the invention are described below. Note that the following embodiments do not in any way limit the scope of the invention laid out in the claims. Note that all elements of the following embodiments should not necessarily be taken as essential requirements for the invention.

1. Acquisition of Sensor Information

It is necessary to specify the state of the user in order to provide the user with an appropriate content to implement an inspiring ubiquitous service or the like. For example, it is desirable to acquire sensor information from a behavior sensor (behavior measurement section), a condition sensor (condition measurement section), and an environment sensor (environment measurement section) that respectively measure the behavior, the condition, and the environment of the user, and specify the state of the user using the acquired sensor information and the like. A method of acquiring the sensor information is described below.

In FIG. 1, the user carries a portable electronic instrument 100 (mobile gateway). The user wears a wearable display 140 (mobile display) near one of the eyes as a mobile control target instrument. The user also wears various sensors as wearable sensors (mobile sensors). Specifically, the user wears an indoor/outdoor sensor 510, an ambient temperature sensor 511, an ambient humidity sensor 512, an ambient luminance sensor 513, a wrist-mounted movement measurement sensor 520, a pulse (heart rate) sensor 521, a body temperature sensor 522, a peripheral skin temperature sensor 523, a sweat sensor 524, a foot pressure sensor 530, a speech/mastication sensor 540, a Global Position System (GPS) sensor 550 provided in the portable electronic instrument 100, a complexion sensor 560 and a pupil sensor 561 provided in the wearable display 140, and the like. A mobile subsystem is formed by the portable electronic instrument 100, mobile control target instruments such as the wearable display 140, the wearable sensors, and the like.

The portable electronic instrument 100 (mobile computer) is a portable information terminal such as a personal digital assistant (PDA) or a notebook PC, and includes a processor (CPU), a memory, an operation panel, a communication device, a display (sub-display), and the like. The portable electronic instrument 100 may have a function of collecting sensor information from a sensor, a function of performing a calculation process based on the collected sensor information, a function of controlling (e.g., display control) the control target instrument (e.g., wearable display) or acquiring information from an external database based on the calculation results, a function of communicating with the outside, and the like. The portable electronic instrument 100 may be an instrument that is also used as a portable telephone, a wristwatch, a portable audio player, or the like.

The user wears the wearable display 140 (information presentation section in a broad sense) near one of the eyes of the user. The wearable display 140 is set so that the display section is smaller than the pupil, and functions as a see-through viewer information display section. Information may be presented (provided) to the user using a headphone, a vibrator, or the like. Examples of the mobile control target instrument (information presentation section) other than the wearable display 140 include a wristwatch, a portable telephone, a portable audio player, and the like.

The indoor/outdoor sensor 510 detects whether the user stays in a room or stays outdoors. For example, the indoor/outdoor sensor emits ultrasonic waves, and measures the time required for the ultrasonic waves to be reflected by a ceiling or the like and return to the indoor/outdoor sensor. The indoor/outdoor sensor 510 is not limited to an ultrasonic sensor, but may be an active optical sensor, a passive ultraviolet sensor, a passive infrared sensor, or passive noise sensor.

The ambient temperature sensor 511 measures the ambient temperature using a thermistor, a radiation thermometer, a thermocouple, or the like. The ambient humidity sensor 512 measures the ambient humidity by utilizing a phenomenon in which an electrical resistance changes due to humidity, for example. The ambient luminance sensor 513 measures the ambient luminance using a photoelectric element, for example.

The wrist-mounted movement measurement sensor 520 measures the movement of the arm of the user using an acceleration sensor or an angular acceleration sensor. The daily performance and the walking state of the user can be more accurately measured using the movement measurement sensor 520 and the foot pressure sensor 530. The pulse (heart rate) sensor 521 is attached to the wrist, finger, or ear of the user, and measures a change in bloodstream due to pulsation based on a change in transmittance or reflectance of infrared light. The body temperature sensor 522 and the peripheral skin temperature sensor 523 measure the body temperature and the peripheral skin temperature of the user using a thermistor, a radiation thermometer, a thermocouple, or the like. The sweat sensor 524 measures skin perspiration based on a change in the surface resistance of the skin, for example. The foot pressure sensor 530 detects the distribution of pressure applied to the shoe, and determines that the user is in a standing state, a sitting state, a walking state, or the like.

The speech/mastication sensor 540 is an earphone-type sensor that measures the possibility that the user speaks (conversation) or masticates (eating). The speech/mastication sensor 540 includes a bone conduction microphone and an ambient sound microphone provided in a housing. The bone conduction microphone detects body sound that is a vibration that occurs from the body during speech/mastication and is propagated inside the body. The ambient sound microphone detects voice that is a vibration that is transmitted to the outside of the body due to speech, or ambient sound including environmental noise. The speech/mastication sensor 540 measures the possibility that the user speaks or masticates by comparing the power of the sound captured by the bone conduction microphone with the power of the sound captured by the ambient sound microphone per unit time, for example.

The GPS sensor 550 detects the position (location) of the user. Note that a portable telephone position information service or peripheral wireless LAN position information may be utilized instead of the GPS sensor 550. The complexion sensor 560 includes an optical sensor disposed near the face, and compares the luminance of light through a plurality of optical band-pass filters to measure the complexion, for example. The pupil sensor 561 includes a camera disposed near the pupil, and analyzes a camera signal to measure the size of the pupil, for example.

In FIG. 1, a robot 1 is provided as an information presentation section that presents information to the user. The robot 1 is a pet-type robot that imitates a dog. The robot 1 includes a plurality of part modules (robot motion mechanisms) such as a body module 600, a head module 610, leg modules 620, 622, 624, 626, and a tail module 630.

The head module 610 includes a touch sensor that detects a stroke operation or a hit operation of the user, a speech sensor (microphone) that detects speech of the user, an image sensor (camera) for image recognition, and a sound output section (speaker) that outputs voice or a call.

A joint mechanism is provided between the body module 600 and the head module 610, between the body module 600 and the tail module 630, and at the joint of the leg module 620, for example. These joint mechanisms include an actuator such as a motor so that joint movement or self-travel of the robot 1 is implemented.

The body module 600 of the robot 1 includes one or more circuit boards, for example. The circuit board is provided with a CPU (processor) that performs various processes, a memory (e.g., ROM or RAM) that stores data and a program, a robot control IC, a sound generation module that generates a sound signal, a wireless module that implements wireless communication with the outside, and the like. A signal from each sensor mounted on the robot is transmitted to the circuit board, and processed by the CPU and the like. The sound signal generated by the sound generation module is output to the sound output section (speaker) from the circuit board. A control signal from the control IC of the circuit board is output to the actuator (e.g., motor) provided in the joint mechanism so that joint movement or self-travel of the robot 1 is controlled.

2. Configuration Example

Figure 2:
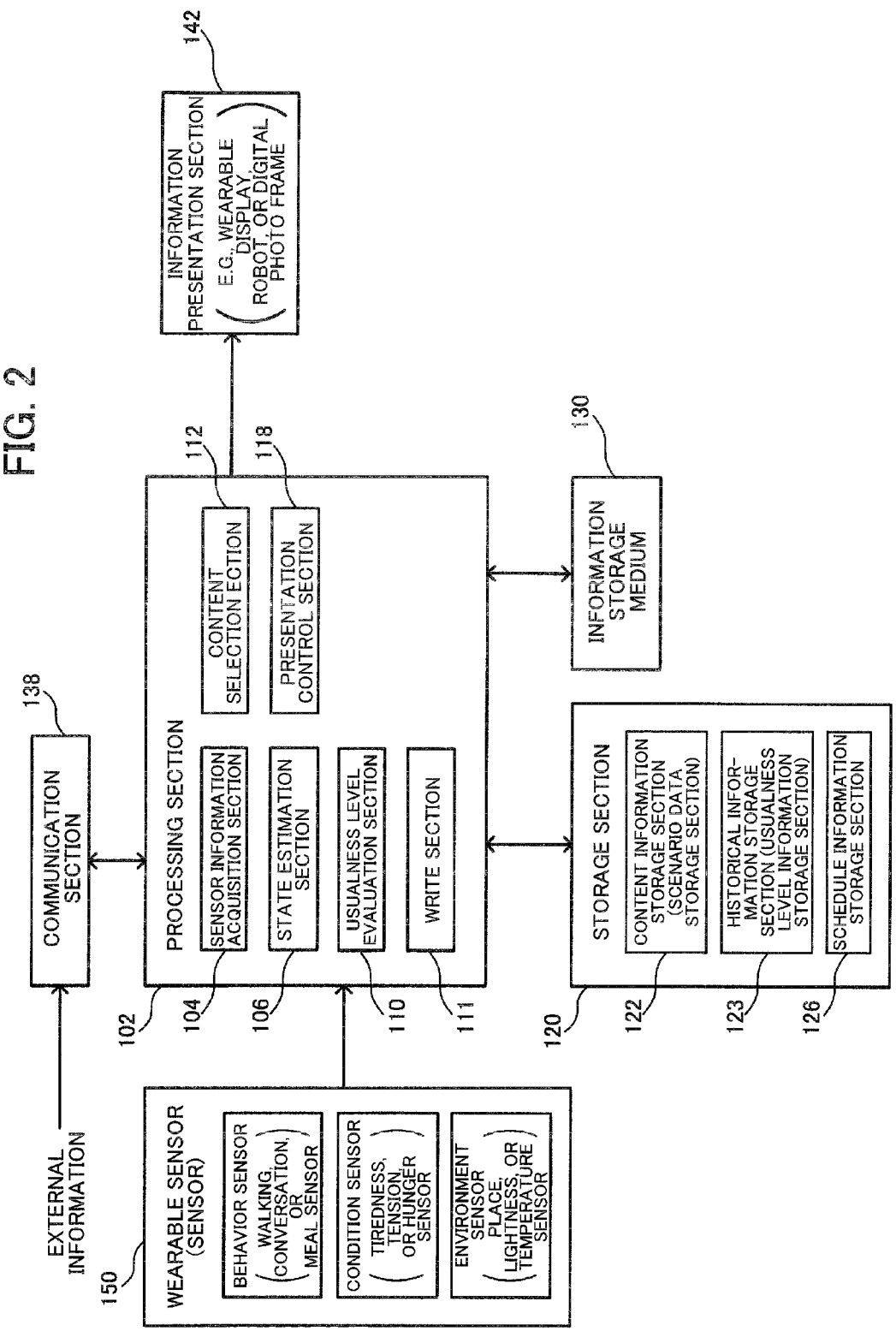
FIG. 2 shows a configuration example of an information processing system according to one embodiment of the invention.

FIG. 2 shows a system configuration example of an information processing system (information presentation system) according to this embodiment. The information processing system shown in FIG. 2 may be implemented by the portable electronic instrument 100, the wearable display 140, a server, a robot, a digital photo frame (described later), and the like.

A processing section 102 performs various processes based on operation information input from an operation section (not shown), sensor information acquired from a wearable sensor 150, and the like. For example, the processing section 102 acquires the sensor information, performs calculations and evaluations, and controls information presentation using an information presentation section 142 (e.g., display). The function of the processing section 102 may be implemented by hardware such as a processor (e.g., CPU) or an ASIC (e.g., gate array), a program stored in an information storage medium 130 (e.g., optical disk, IC card, or HDD), or the like.

A storage section 120 serves as a work area for the processing section 102, the communication section 138, and the like. The function of the storage section 120 may be implemented by a memory (e.g., RAM), a hard disk drive (HDD), or the like. The storage section 120 includes a content information storage section 122, a historical information storage section 123 (usualness level information storage section), and a schedule information storage section 126.

The content information storage section 122 (content database) stores information about a content such as an image, a video, a music, a voice, a text (characters or sentence), or various types of data. The content may be generated in real time, or downloaded from the outside through the communication section 138, for example. The content information storage section 122 may store meta-information (additional information) linked to the content.

The historical information storage section 123 stores state historical information about the user. The state historical information about the user refers to historical information about the state of the user that is at least one of the behavior, the condition, and the environment of the user, for example. The historical information storage section 123 stores the usualness level of the user so that the usualness level is linked to each state indicated by the state historical information about the user. A usualness level information storage section may be provided separately from the historical information storage section 123, and may store usualness level information about the user. For example, the usualness level information storage section stores the usualness level of the user so that the usualness level is linked to the place of stay of the user or stores the place and the time zone of stay of the user. The schedule information storage section 126 stores schedule information (schedule data or schedule information) about the user.

The information storage medium 130 (computer-readable medium) stores a program, data, and the like. The function of the information storage medium 130 may be implemented by an optical disk (CD or DVD) or the like. The processing section 102 performs various processes according to this embodiment based on a program (data) stored in the information storage medium 130. Specifically, the information storage medium 130 stores a program that causes a computer (i.e., a device including an operation section, a processing section, a storage section, and an output section) to function as each section according to this embodiment (i.e., a program that causes a computer to execute the process of each section).

The processing section 102 includes a sensor information acquisition section 104, a state estimation section 106, a usualness level evaluation section 110, a write section 111, a content selection section 112, and a presentation control section (display control section) 118. Note that various modifications may be made, such as omitting some (e.g., content selection section and presentation control section) of these elements or adding other elements.

The sensor information acquisition section 104 acquires sensor information from the wearable sensor 150 (sensor in a broad sense). Specifically, the wearable sensor 150 includes at least one of a behavior sensor that measures the behavior (e.g., walk, conversation, meal, movement of hands and feet, emotion, or sleep) of the user, a condition sensor that measures the condition (e.g., tiredness, tension, hunger, mental state, physical condition, or event that has occurred for the user) of the user, and an environment sensor that measures the environment (place, time, lightness, temperature, or humidity) of the user. The sensor information acquisition section 104 acquires sensor information from these sensors.

Note that the sensor may be a sensor device, or may be a sensor instrument that includes a control section, a communication section, and the like in addition to the sensor device. The sensor information may be primary sensor information directly obtained from the sensor, or may be secondary sensor information obtained by processing (information processing) the primary sensor information.

The state estimation section 106 (state identification section) estimates (identifies) the state of the user (at least one of the behavior, the condition, and the environment of the user) based on the sensor information acquired by the sensor information acquisition section 104 and the like. Specifically, the state estimation section 106 multiplies or sums up the acquired sensor information to implement various calculation processes for filtering (selecting) or analyzing the sensor information, for example. The state estimation section 106 then performs a state identification process that estimates the current state of the user. Alternatively, the state estimation section 106 then performs a state prediction process that estimates the future state of the user.

As shown by the following expression (1), digitized measured values $X_j$ of a plurality of pieces of sensor information from a plurality of sensors and each coefficient are stored in a coefficient storage section (not shown), and the state estimation section 106 performs product-sum calculations on the measured values $X_j$ and coefficients $A_{ij}$ shown by a two-dimensional matrix, for example. As shown by the following expression (2), the state estimation section 106 calculates the n-dimensional vector $Y_i$ using the product-sum calculation results as multi-dimensional coordinates. Note that i is the i coordinate in the n-dimensional space, and j is a number assigned to each sensor.

$$\begin{pmatrix} Y_0 \\ Y_1 \\ Y_2 \\ \vdots \\ Y_i \\ \vdots \\ Y_n \end{pmatrix} = \begin{pmatrix} A_{00} & \cdots & A_{0m} \\ \vdots & & \vdots \\ \vdots & A_{ij} & \vdots \\ \vdots & & \vdots \\ A_{n0} & \cdots & A_{nm} \end{pmatrix} \begin{pmatrix} X_0 \\ X_1 \\ X_2 \\ \vdots \\ X_j \\ \vdots \\ X_m \end{pmatrix} \quad (1)$$

$$Y_i = A_{00}X_0 + \ldots + A_{ij}X_j \ldots + A_{nm}X_m \quad (2)$$

A filtering process that removes unnecessary sensor information from the acquired sensor information, an analysis process that estimates the behavior, the condition, and the environment (TPO information) of the user based on the sensor information, and the like can be implemented by performing the calculation process shown by the expressions (1) and (2). For example, if the coefficients A multiplied by the pulse (heart rate), perspiration amount, and body temperature measured values X are set to be larger than the coefficients multiplied by the remaining sensor information measured values, the value Y calculated by the expressions (1) and (2) indicates the "excitement level" that is the state of the user. It is possible to estimate whether the user is seated and talks, talks while walking, thinks quietly, or sleeps by appropriately setting the coefficient multiplied by the speech measured value X and the coefficient multiplied by the foot pressure measured value X.

The TPO (time, place, and occasion) information that is at least one of time information (e.g., year, month, week, day, and time), place information (e.g., position, area, and distance) about the user, and occasion (condition) information (e.g., mental/physical condition and event that has occurred for the user) about the user can be obtained by thus estimating the state of the user.

The state of the user estimated by the state estimation section 106 is the behavior, the condition, or the environment of the user, for example. The behavior of the user may be estimated by determining that the user stands still, walks, runs, sits, lies down, or goes up/down the stairs based on information from the behavior sensor attached to the user, determining the behavior or posture of the user using a sensor (external camera or home sensor) disposed around the user, or determining that the user stays or moves based on the path of the position of the user determined by a position detection sensor, for example. The condition of the user refers to the mental condition or the physical condition of the user, for example. The condition of the user may be estimated by determining stress, excitement, tension, a health condition, and the like based on information from a biosensor attached to the user. The environment of the user refers to place information, time information, and ambient environment information about the user, for example. The environment of the user may be estimated by determining the place of stay (current location) of the user using a position detection sensor, acquiring the date, the day of the week, and the time using a clock, or acquiring the temperature, atmospheric pressure, illuminance, noise, and the like using an ambient environment sensor, for example. In this case, since it is difficult to accurately specify the state of the user based on the sensor information, the state estimated by the state estimation section 106 may not necessarily be accurate.

The state of the user may be estimated using information other than the sensor information. Specifically, the state of the user may be estimated using the schedule information (schedule data or schedule information) about the user stored in the schedule information storage section 126, or external information acquired through the communication section 138 or the like. For example, the schedule of the user is estimated based on a schedule input by the user, or an accompanying schedule is estimated from the schedule input by the user. Alternatively, the state of the user is estimated based on external information such as information (e.g., today's weather/traffic information) acquired from web information or an external database through the Internet or the like, or information acquired from another user (e.g., message information from another user).

The state estimation accuracy can be improved by utilizing the schedule information or the external information as compared with the case of estimating the state of the user using only the sensor information. For example, the behavior of the user can be estimated with higher accuracy by estimating the behavior of the user using the sensor information and the schedule information in combination.

The state estimation section 106 (place determination section) specifies the place of stay of the user. For example, the state estimation section 106 specifies an area and a spot that is narrower than the area as the place of stay of the user, and determines whether the user stays within the area or stays within the spot that is located within the area and narrower than the area. Specifically, the state estimation section 106 calculates the standard deviation of the position of the user within a given period. The state estimation section 106 determines whether the user stays within the area or the spot based on the standard deviation. More specifically, the state estimation section 106 determines whether the user stays within the area or the spot based on whether or not the standard deviation of the position of the user within a given period is equal to or less than a first threshold value. The state estimation section 106 determines whether or not the user stays within the spot based on whether or not the standard deviation of the position of the user within a given period is equal to or less than a second threshold value that is smaller than the first threshold value. Note that the given period for determining the area and the given period for determining the spot may be the same or different. A place may be divided into three or more stages (granularity) instead of two stages (area and spot).

Note that the place of stay (area and spot) of the user may be specified by specifying the position of the user by utilizing a GPS sensor, a portable telephone position information service, or peripheral wireless LAN position information, and specifying the place of stay of the user by utilizing map information.

The usualness level evaluation section 110 evaluates the usualness level (unusualness level) of the user. For example, the usualness level evaluation section 110 evaluates (determines) the usualness level (usual activity level) of the user based on the acquired sensor information and the like. Specifically, the usualness level evaluation section 110 utilizes latitude/longitude information from the GPS sensor, and simply evaluates the usualness level of the user from the experience of stay near that position. Alternatively, when the state estimation section 106 has estimated the state of the user (e.g., current location) based on the acquired sensor information and the like, the usualness level evaluation section 110 may evaluate the usualness level of the user based on the state of the user estimated by the state estimation section 106. Specifically, the usualness level evaluation section 110 determines whether the current state of the user is a usual state or an unusual state to evaluate the usualness level of the user.

For example, the current usualness level of the user may be evaluated by comparing information about a state history of the user (e.g., state history of the location of the user) with information about the estimated current state (e.g., current location) of the user. The current usualness level of the user may also be evaluated by comparing the predicted behavior of the user with the actual behavior of the user. Note that the term "usualness level" refers to a parameter that indicates the degree of usual behavior (common or ordinary) of the current state of the user as compared with the state history of the user, for example. A process that evaluates the usualness level of the user may be considered to be equivalent to a process that evaluates the unusualness level (unusualness or abnormality) of the user.

When the state estimation section 106 has determined that the user stays (is positioned) within an area, the usualness level evaluation section 110 may evaluate the usualness level of the user with respect to that area. For example, the usualness level evaluation section 110 evaluates the usualness level of the user based on the experience of stay of the user within that area. When the state estimation section 106 has determined that the user stays (is positioned) within a spot, the usualness level evaluation section 110 may evaluate the usualness level of the user with respect to that spot. For example, the usualness level evaluation section 110 evaluates the usualness level of the user based on the experience of stay of the user within that spot.

The write section 111 writes the state historical information about the user and the usualness level of the user. Specifically, the write section 111 writes the usualness level of the user evaluated by the usualness level evaluation section 110 in the historical information storage section 123 so that the usualness level is linked to each state indicated by the state historical information about the user. For example, the write section 111 writes the usualness level of the user in the historical information storage section 123 so that the usualness level is linked to the state (e.g., behavior, condition, or environment) of the user corresponding to each time (time zone).

The content selection section 112 selects the content based on the state and the usualness level of the user. For example, the content selection section 112 selects the content presented to the user from the contents stored in the content information storage section 122 based on the usualness level of the user linked to each state indicated by the state historical information about the user. Specifically, the content selection section 112 preferentially extracts the state of the user linked to a low usualness level from the state historical information stored in the historical information storage section 123. The content selection section 112 then selects the content corresponding to the extracted state of the user. Specifically, the content selection section 112 extracts the state of the user linked to the usualness level that is lower than a given value, and selects the content corresponding to the extracted state of the user. For example, the content selection section 112 sequentially extracts the state of the user in the order from the state of the user linked to the lowest usualness level, and selects the content corresponding to the extracted state of the user.

Note that the content selection section 112 may extract the state of the user linked to a high usualness level and select the content corresponding to the extracted state of the user, or may randomly select the usualness level and select the content corresponding to the selected usualness level. For example, the content selection section 112 preferentially extracts the state of the user linked to a high usualness level from the state historical information stored in the historical information storage section 123, and selects the content corresponding to the extracted state of the user. Specifically, the content selection section 112 extracts the state of the user linked to the usualness level that is higher than a given value, and selects the content corresponding to the extracted state of the user. For example, the content selection section 112 sequentially extracts the state of the user in the order from the state of the user linked to the highest usualness level, and selects the content corresponding to the extracted state of the user. According to this configuration, the user can be notified that the state (e.g., behavior) of the user is in a rut (i.e., high usualness level), so that content that prompts the user to change such a state can be presented.

The content selection section 112 may select the content presented to the user from the contents stored in the content information storage section 122 based on the state and the usualness level of the user. For example, the state estimation section 106 predicts the future state of the user based on the schedule information about the user stored in the schedule information storage section 126. In this case, the usualness level evaluation section 110 evaluates the usualness level of the predicted future state of the user. Specifically, the usualness level evaluation section 110 evaluates whether or not the predicted future state of the user is usual. The content selection section 112 then selects the content presented to the user based on the usualness level of the future state of the user. Alternatively, the content selection section 112 may select the content presented to the user based on the usualness level of the previous state of the user or the usualness level of the current state of the user.

Suppose that the usualness level evaluation section 110 has evaluated a plurality of types of sub-usualness level, for example. Specifically, suppose that the usualness level evaluation section 110 has evaluated a first sub-usualness level and a second sub-usualness level that differs in evaluation target item from the first sub-usualness level. For example, the first sub-usualness level is evaluated based on a first evaluation target item, the second sub-usualness level is evaluated based on a second evaluation target item, and the first evaluation target item and the second evaluation target item differ in at least one evaluation target item.

When the content selection section 112 selects the content based on the first sub-usualness level, the content selection section 112 selects the content corresponding to the first evaluation target item. On the other hand, when the content selection section 112 selects the content based on the second sub-usualness level, the content selection section 112 selects the content corresponding to the second evaluation target item. Examples of the first evaluation target item and the second evaluation target item include the time information, the place information about the user, the behavior information about the user, the condition information about the user, the schedule information about the user, and the like. For example, when the usualness level evaluation section 110 has evaluated the usualness level based on the time information, the place information, the behavior information, the condition information, and the schedule information, the content selection section 112 selects the content relating to the time, place, behavior, condition, and schedule.

When the state estimation section 106 has determined that the user stays within an area, the content selection section 112 selects the content based on the usualness level of the user with respect to that area. For example, when the user usually stays within that area, the content selection section 112 selects the content that prompts the user to unusual behavior. On the other hand, when the user does not usually stay within that area, the content selection section 112 selects the content that prompts the user to usual behavior. When the state estimation section 106 has determined that the user stays within a spot, the content selection section 112 selects the content based on the usualness level of the user with respect to that spot. For example, when the user usually stays within that spot, the content selection section 112 selects the content that prompts the user to unusual behavior. On the other hand, when the user does not usually stay within that spot, the content selection section 112 selects the content that prompts the user to usual behavior.

Note that the content that prompts the user to unusual behavior is a content that is not familiar to the user, and the content that prompts the user to usual behavior is a content that is familiar to the user, for example. Specifically, the content information storage section 122 stores the familiarity of the user with each content corresponding to each content. For example, the content information storage section 122 stores the familiarity of the user as content tag information. When the usualness level evaluation section 110 evaluates that the user usually stays within that area or spot, the content selection section 112 selects the content corresponding to low familiarity from the contents stored in the content information storage section 122. When the usualness level evaluation section 110 evaluates that the user does not usually stay within that area or spot, the content selection section 112 selects the content corresponding to high familiarity from the contents stored in the content information storage section 122.

When the state estimation section 106 has determined that the user stays within a spot within an area, the content selection section 112 preferentially selects the content based on the usualness level of the user with respect to that spot. When the state estimation section 106 has determined that the user stays in a place within an area other than a spot, the content selection section 112 selects the content based on the usualness level of the user with respect to that area. For example, when the user stays within a spot within an area, the content selection section 112 selects the content based on the usualness level of the user with respect to that spot. The content selection section 112 then selects the content based on the usualness level of the user with respect to that area, or does not select the content based on the usualness level of the user with respect to that area. On the other hand, when the user stays in a place within an area other than a spot, the content selection section 112 selects the content based on the usualness level of the user with respect to that area.

The presentation control section 118 causes the information presentation section 142 to present the selected content to the user. For example, when the information presentation section 142 is a wearable display or a digital photo frame, the presentation control section 118 causes the wearable display or the digital photo frame to present (display) the selected content (content image) to the user. When the information presentation section 142 is a robot, the presentation control section 118 causes the robot to present the selected content to the user. Specifically, the content information storage section 122 stores scenario data formed by a plurality of phrases as the content presented to the user. When the content selection section 112 has selected the scenario data based on the usualness level of the user and the like, the presentation control section 118 causes the robot to output the phrase indicated by the selected scenario data.

3. First Operation Example

Figure 3:
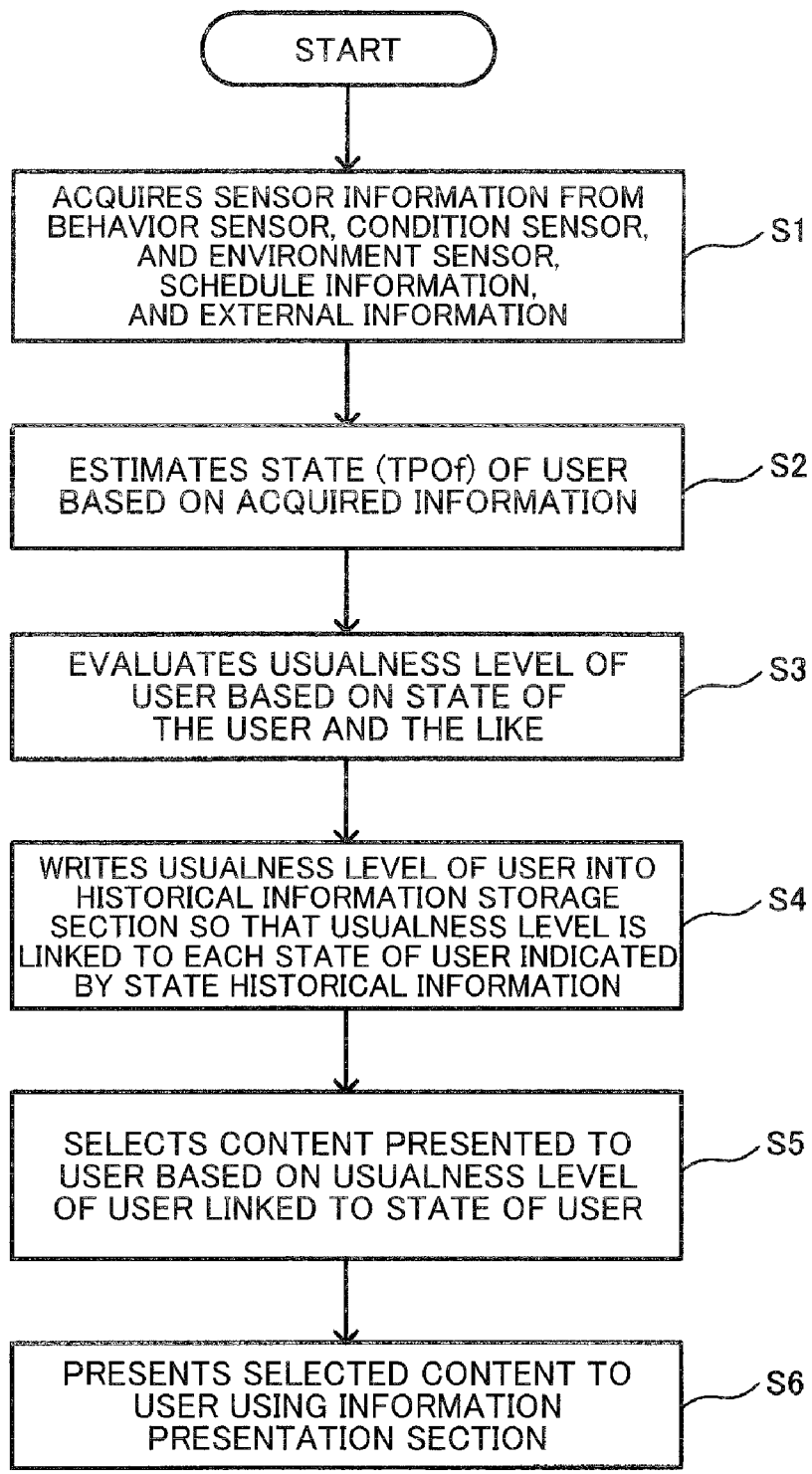
FIG. 3 is a flowchart illustrative of a first operation example according to one embodiment of the invention.

FIG. 3 is a flowchart illustrative of a first operation example according to this embodiment.

The sensor information from the behavior sensor, the condition sensor, and the environment sensor, the schedule information, and the external information are acquired (step S1). The state (TPOf) of the user is estimated based on the acquired information (step S2).

The usualness level of the user is evaluated based on the state of the user and the like (step S3). The usualness level of the user is written into the historical information storage section 123 so that the usualness level is linked to each state of the user indicated by the state historical information (step S4). The content presented to the user is selected based on the usualness level of the user linked to the state of the user (step S5), and the selected content is presented to the user using the information presentation section 142 (e.g., robot or digital photo frame) (step S6).

In FIG. 3, the state of the user is estimated in the step S2, and the usualness level is evaluated in the step S3 based on the state of the user. Note that the usualness level may be directly evaluated based on the sensor information and the like without performing the step S2. In the step S4, the state of the user and the usualness level need not necessarily be written into the historical information storage section 123 at the same time. For example, the usualness level may be determined corresponding to each state of the user recorded with the time, and linked to the state of the user.

FIG. 4 shows an example of the data structure of the historical information storage section 123. In FIG. 4, the historical information storage section 123 stores the usualness level so that the usualness level is linked to the state (e.g., date, time, and place) of the user.

For example, the user stayed at home at about 8:00 AM on Sunday. In this case, since the usualness level of the state of the user is determined to be high, the usualness level "10" is linked to the state (place and time) of the user, for example. The user went to Asakusa at about 9:00 AM to take the train to Nikko. In this case, since the usualness level of the state of the user (i.e., in Asakusa on Sunday morning) is determined to be low, the usualness level "6" is linked to the state of the user, for example. The user arrived at the Nikko Toshogu shrine at about noon. Since the Nikko Toshogu shrine is a sightseeing spot that the user rarely visits, the usualness level of the state of the user is determined to be low (i.e., the behavior is determined to be unusual). Therefore, the usualness level "1" is linked to the state of the user (i.e., at the Nikko Toshogu shrine on Sunday noon), for example. In this example, the value (parameter) of the usualness level decreases as the usualness level decreases.

The user stayed at home at about 8:00 AM on a weekday. In this case, since the state of the user is determined to be usual, the usualness level "10" is linked to the state of the user, for example. The user arrived at the office in Shinjuku at about 10:00 AM. In this case, since the usualness level of the state of the user is determined to be high, the usualness level "10" is linked to the state of the user. The user visited a restaurant in Shinjuku for lunch at about noon. In this case, since the usualness level of the state of the user is determined to be medium, the usualness level "6" is linked to the state of the user, for example. The user visited a hotel near the office at night on that day. In this case, since the usualness level of the state of the user is determined to be relatively low, the usualness level "3" is linked to the state of the user, for example.

According to this embodiment, since the usualness level is stored so that the usualness level is linked to each state of the user indicated by the state historical information, the usualness level of the user corresponding to each state of the user can be acquired by a simple process by merely reading the state historical information from the historical information storage section 123. Since various types of information processing and information presentation can be performed based on the acquired usualness level, a novel information processing system can be provided.

When the user was in the office building in Shinjuku in the daytime on a holiday, for example, the usualness level of the state of the user is determined to be low. Specifically, the usualness level can be appropriately evaluated by evaluating the place of stay of the user and the time zone in combination when evaluating the usualness level.

If the usualness level in Shinjuku where the user's office is situated is determined based on a large area described later, whether the user is in the office or the hotel near the office cannot be determined so that the usualness level may not be accurately evaluated. However, such a situation can be prevented by determining the usualness level based on a spot (described later) or the like that is smaller than the area.

As shown in FIG. 4, the state historical information about the user is sequentially updated. The updated state historical information is stored in the historical information storage section of the portable electronic instrument 100, for example.

Figure 5A:
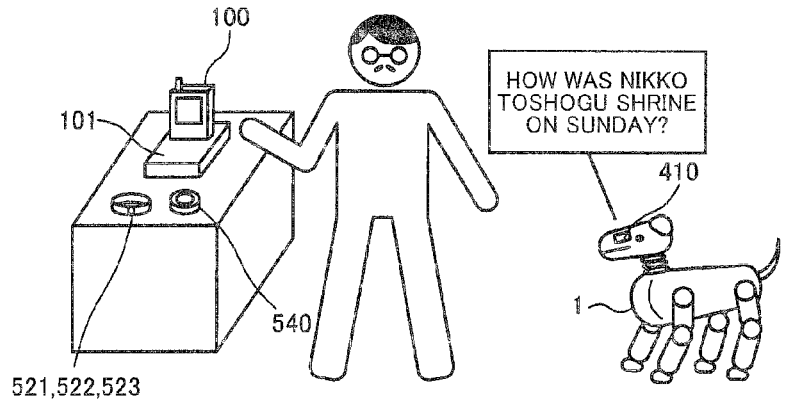
FIGS. 5A to 5C show examples of information presentation using a robot.

In FIG. 5A, the user who has returned home has connected the portable electronic instrument 100 to a cradle 101 to charge the portable electronic instrument 100, for example. In FIG. 5A, when the portable electronic instrument 100 has been connected to the cradle 101, the portable electronic instrument 100 determines that an event that makes the robot 1 available has occurred, and activates the robot 1. Note that the portable electronic instrument 100 may activate the robot 1 when the portable electronic instrument 100 has determined that the user has approached the robot 1 instead of connection of the portable electronic instrument 100 to the cradle 101. For example, when information is transferred between the portable electronic instrument 100 and the robot 1 via wireless communication, occurrence of an event that makes the robot 1 available may be determined by detecting the strength of a radio signal.

When an event that makes the robot 1 available has occurred, the robot 1 is activated, and can be utilized. In this case, the state historical information about the user stored in the historical information storage section of the portable electronic instrument 100 is transferred to and stored in a historical information storage section of the robot 1, for example. This makes it possible to control the robot 1 (e.g., conversation) based on the state historical information. Note that the portable electronic instrument 100 or a server (described later) may select the content based on the state historical information and the usualness level, and the robot 1 may speak based on the scenario data of the selected content and the like.

In FIG. 5A, when the robot 1 speaks to the user, the state of the user linked to a low usualness level is selected from the state historical information about the user shown in FIG. 4. In FIG. 4, the state of the user linked to the usualness level "2" (i.e., a visit to the Nikko Toshogu shrine) is selected as the state of the user on Sunday. The robot 1 selects the content linked to the selected state of the user, and speaks. Specifically, the robot 1 speaks "How was the Nikko Toshogu shrine on Sunday?" based on the scenario data of the selected content. Therefore, the user recalls the past unusual experience.

Specifically, the user is generally interested in an event that occurred when the user had an unusual experience as compared with an event that occurred in a usual situation. For example, when the robot 1 speaks to remind the user of a past event, it is considered that the user is interested in an event that occurred in a place that the user rarely visits as compared with an event that occurred in a place familiar to the user. If the robot 1 preferentially speaks about an event that occurred in a situation in which the user got excited and impressed by an unusual experience, an inspiring ubiquitous service that inspires the user to become aware of something through conversation with the robot 1 can be implemented instead of a convenience provision service.

Therefore, this embodiment focuses on the fact that the usualness level (unusualness level) of the user can be determined by estimating the state of the user based on the sensor information and the like, and employs a method that stores the acquired usualness level of the user so that the usualness level is linked to each state of the user indicated by the state historical information. This makes it possible to preferentially extract an event during an unusual experience with a low usualness level and present the content corresponding to the event to the user, or preferentially extract an event during a usual situation with a high usualness level and present the content corresponding to the event to the user so that the user acts in a different way.

Figure 5B:
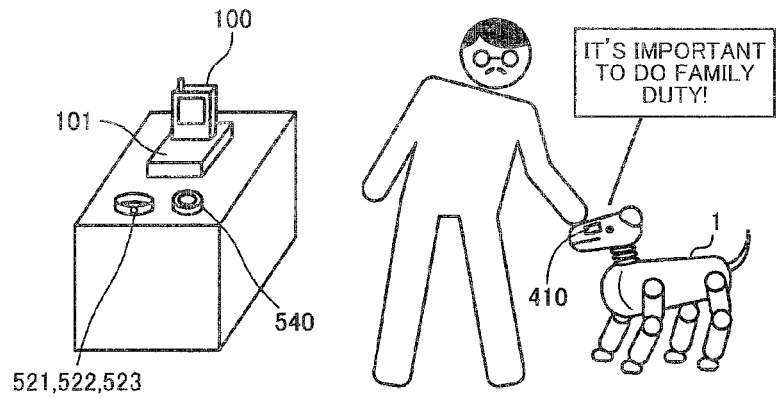

In FIG. 5B, the user who is interested in the conversation with the robot 1 (see FIG. 5A) about the unusual experience strokes the robot 1. The stroke operation (i.e., the user's reaction to the speech of the robot 1) of the user is detected by a touch sensor 410 of the robot 1. The robot 1 then speaks "It's important to do family duty!", for example. In FIG. 5B, the phrase (presentation information) that is subsequently spoken by the robot 1 is determined based on the user's reaction (stroke operation) to the phrase spoken by the robot 1 (information presented by the robot).

Figure 5C:
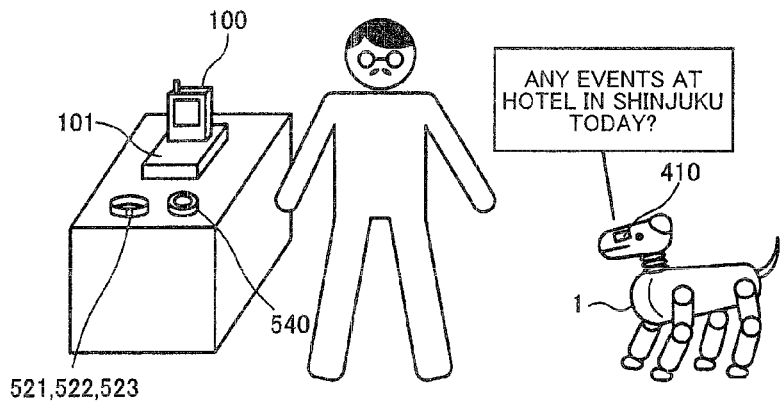

In FIG. 5C, when the robot 1 speaks about an event that the user experienced today, the state of the user linked to a low usualness level is selected from today's state historical information about the user shown in FIG. 4, for example. Specifically, the state of the user linked to the usualness level "3" (i.e., a visit to a hotel in Shinjuku) is selected from today's state historical information about the user. The robot 1 then speaks "Any events at the hotel in Shinjuku today?" based on the scenario data of the content corresponding to this state of the user. Therefore, the user can enjoy conversation with the robot 1 about today's unusual experience. When the user has again stroked the robot 1, for example, the robot 1 recognizes that the user is interested in the topic. The phrase to be subsequently spoken by the robot 1 is then determined, and the robot 1 speaks.

4. Second Operation Example

Figure 6:
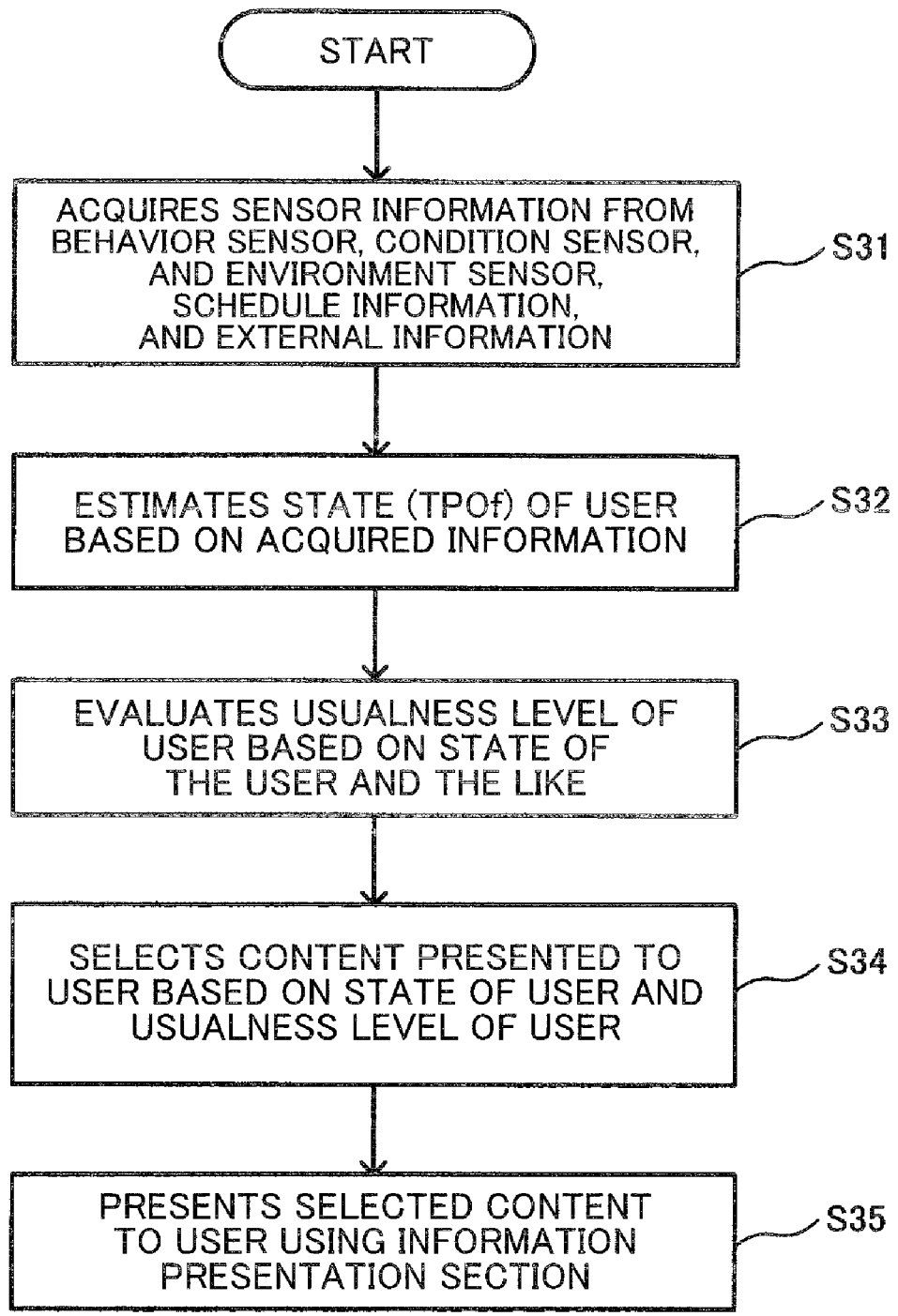
FIG. 6 is a flowchart illustrative of a second operation example according to one embodiment of the invention.

FIG. 6 is a flowchart illustrative of a second operation example according to this embodiment.

The sensor information from the behavior sensor, the condition sensor, and the environment sensor, the schedule information, and the external information are acquired (step S31). The state (TPOf) of the user is estimated based on the acquired information (step S32).

The usualness level of the user is evaluated based on the state of the user and the like (step S33). The content presented to the user is selected based on the state of the user and the usualness level of the user (step S34), and the selected content is presented to the user using the information presentation section 142 (e.g., robot or digital photo frame) (step S35).

Figure 7:
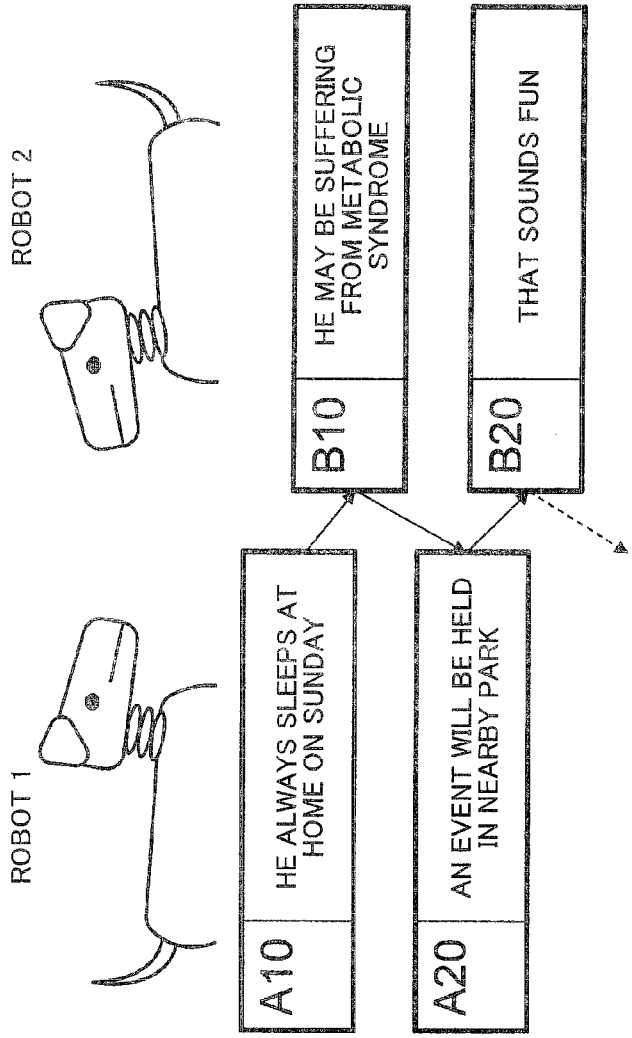
FIG. 7 is a view illustrative of a method that presents a content based on the current state of the user and the usualness level.
Figure 8:
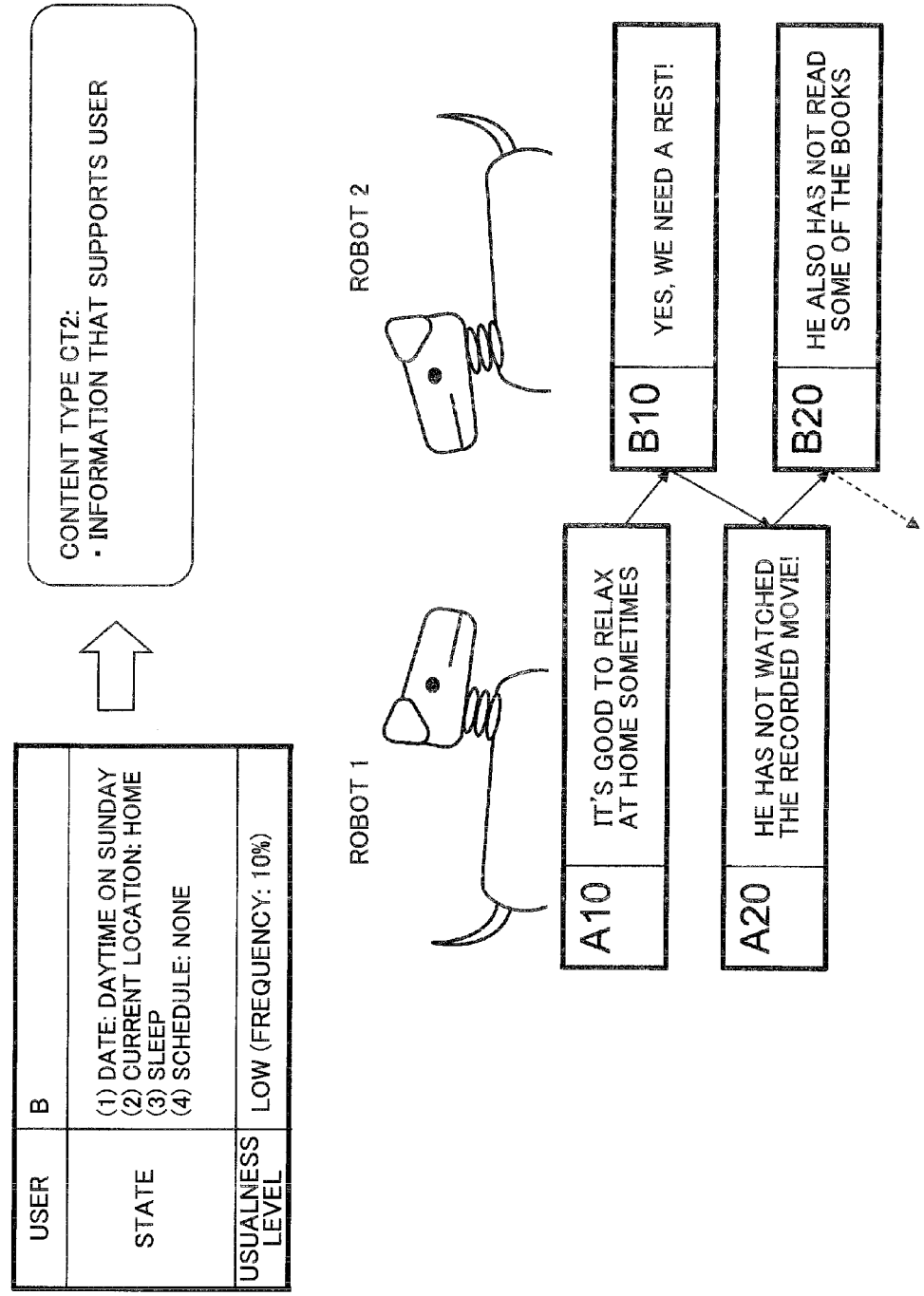
FIG. 8 is a view illustrative of a method that presents a content based on the current state of the user and the usualness level.

FIGS. 7 to 14 show specific examples of a method that selects the content based on the state of the user and the usualness level and presents the selected content to the user. FIGS. 7 to 12 show an example of a method that presents the content to the user by utilizing conversation with the robot. FIGS. 7 and 8 show examples of a method that evaluates the usualness level of the current state of the user to select the content.

In FIG. 7, a user A sleeps at home in the daytime on Sunday, and has no schedule. The state of the user may be determined based on the sensor information, the schedule information, and the like.

The usualness level of the state of the user A shown in FIG. 7 is evaluated as high based on the state history of the user A. In this case, a content type CT1 that presents information that prompts the user A to act in a different way or information about a new experience is selected, for example. The robots 1 and 2 have a conversation based on the scenario data of the selected content type CT1.

Specifically, the robot 1 speaks "He always sleeps at home on Sunday", and the robot 2 speaks "He may be suffering from metabolic syndrome", for example. The robot 1 then speaks "An event will be held in the nearby park", and the robot 2 speaks "That sounds fun".

This makes it possible to prompt the user to become aware of his state (i.e., always sleeps at home on Sunday) through the conversation between the robots 1 and 2. If the user is prompted to a new experience (i.e., goes to the event in the nearby park), it is expected that the user will become aware of something, discover something, or get impressed by something. Therefore, an inspiring ubiquitous service that inspires the user to do something through the conversation between the robots 1 and 2 can be implemented instead of a convenience provision service.

A conversation between the user and the robot is generally implemented by a one-to-one relationship (e.g., one user and one robot).

In FIG. 7, two robots 1 and 2 (a plurality of robots in a broad senses) are provided for one user, and a conversation is implemented by a one-to-two (one-to-N in a broad sense) relationship. The user listens to the conversation between the robots 1 and 2 instead of directly having a conversation with the robots 1 and 2.

In this case, the information presented to the user through the conversation between the robots 1 and 2 is based on the state of the user estimated based on the sensor information from the behavior sensor, the condition sensor, and the environment sensor included in the wearable sensor or the like. Therefore, the user can be indirectly notified of the past or current behavior of the user, the past or current condition of the user, and the past or current environment that surrounds the user through the conversation between the robots 1 and 2.

This makes it possible to implement an inspiring ubiquitous service that appeals to the user's mind through the conversation between the robots 1 and 2 to prompt the user to become aware of the behavior, the condition, and the environment of the user for further personal growth, instead of a convenience provision service that unilaterally presents information to the user.

In FIG. 8, a user B sleeps at home in the daytime on Sunday, and has no schedule. The usualness level of such a state of the user is evaluated as high for the user A shown in FIG. 7, but is evaluated as low for the active user B shown in FIG. 8. In this case, a content type CT2 that presents information that supports the user B is selected, for example. The robots 1 and 2 have a conversation based on the scenario data of the selected content type CT2.

Specifically, the robot 1 speaks "It's good to relax at home sometimes", and the robot 2 speaks "Yes, we need a rest!", for example. The robot 1 then speaks "He has not watched the recorded movie!", and the robot 2 speaks "He also has not read some of the books".

This makes it possible to prompt the user B who is active even on Sunday to take a rest to support the user.

Figure 9:
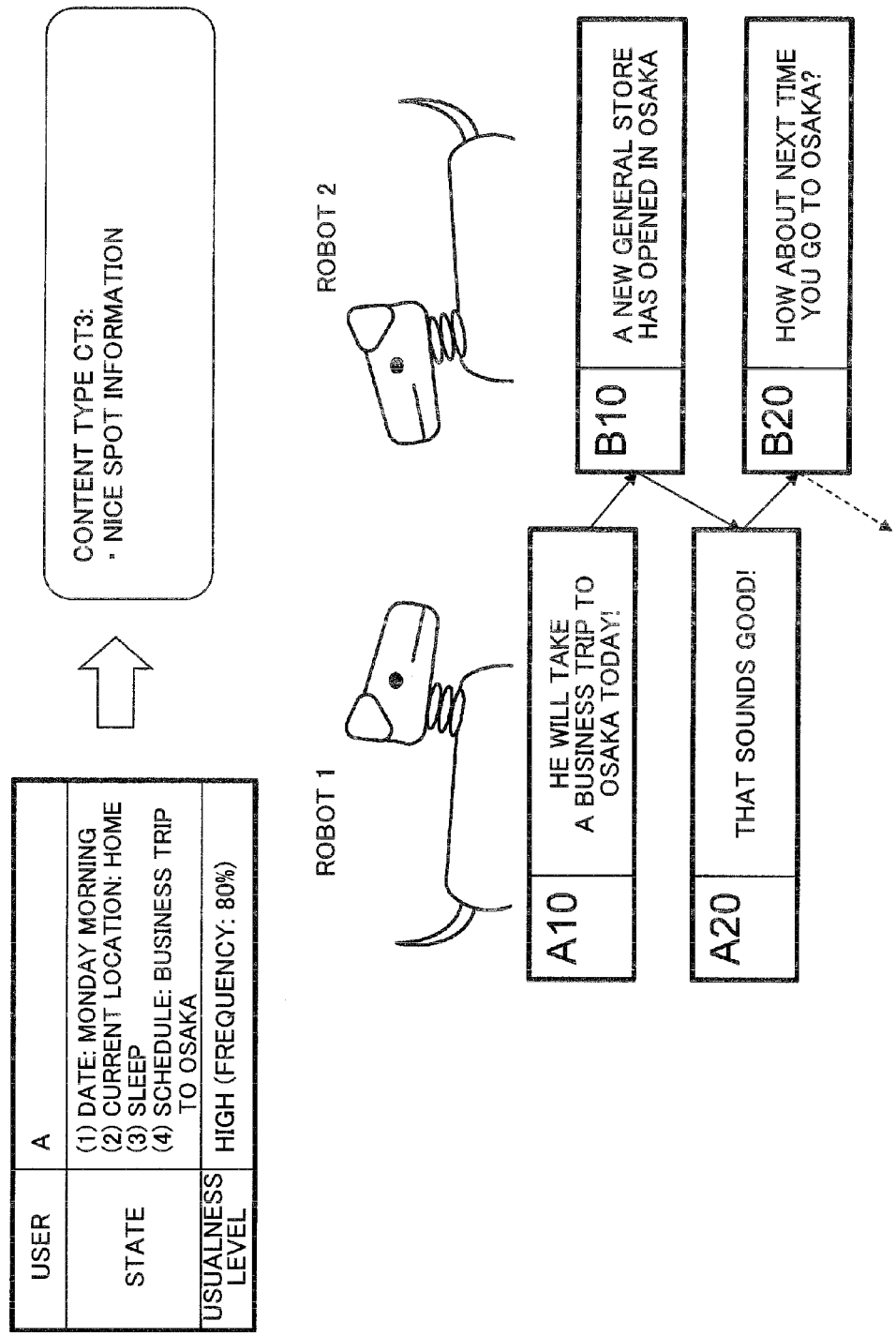
Figure 10:
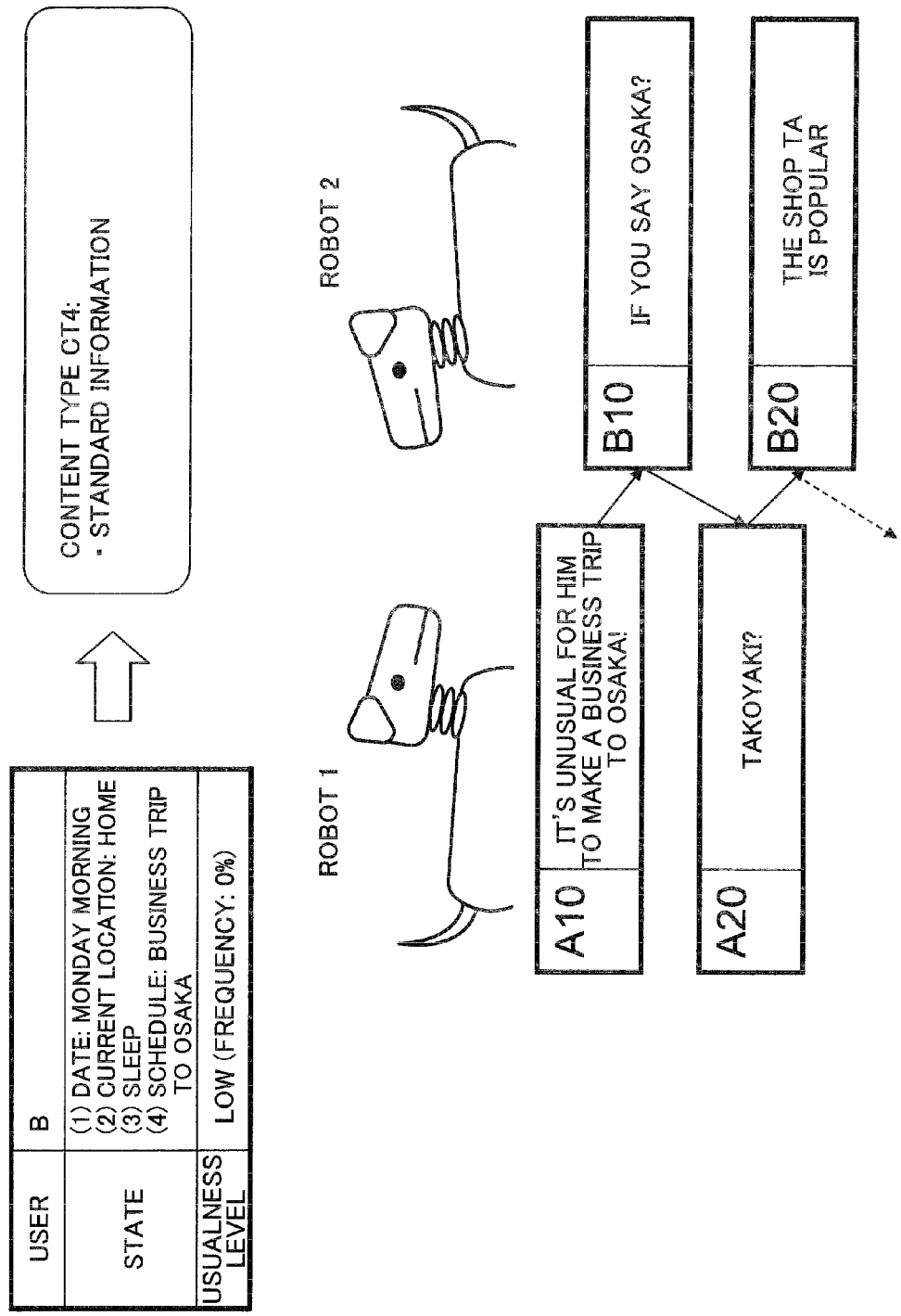
FIG. 10 is a view illustrative of a method that presents a content based on the future state of the user and the usualness level.

FIGS. 9 and 10 show examples of a method that evaluates the usualness level of the future state (schedule) of the user to select the content.

In FIG. 9, a user A stays at home on Monday morning, and is scheduled to make a business trip to Osaka. The future state may be determined based on the schedule information and the like. Since the user A frequently makes a business trip to Osaka, the usualness level of the state of the user A is determined to be high. In this case, a content type CT3 that presents nice spot information is selected, for example. The robots 1 and 2 have a conversation based on the scenario data of the selected content type CT3.

Specifically, the robot 1 speaks "He will take a business trip to Osaka today!", and the robot 2 speaks "A new general store has opened in Osaka", for example. The robot 1 then speaks "That sounds good!", and the robot 2 speaks "How about next time you go to Osaka?".

This makes it possible to prompt the user to a new experience by providing the user who frequently make a business trip to Osaka with the information about nice spots in Osaka.

In FIG. 10, a user B is scheduled to make a business trip to Osaka. Since the user B rarely makes a business trip, the usualness level of the state of the user B is determined to be low. In this case, a content type CT4 that presents standard information is selected, for example. The robots 1 and 2 have a conversation based on the scenario data of the selected content type CT4.

Specifically, the robot 1 speaks "It's unusual for him to make a business trip to Osaka!", and the robot 2 speaks "If you say Osaka?", for example. The robot 1 then speaks "Takoyaki?", and the robot 2 speaks "The shop TA is popular".

This makes it possible to reassure the user who is uneasy about the future schedule by providing the standard information about an unknown place.

Figure 11:
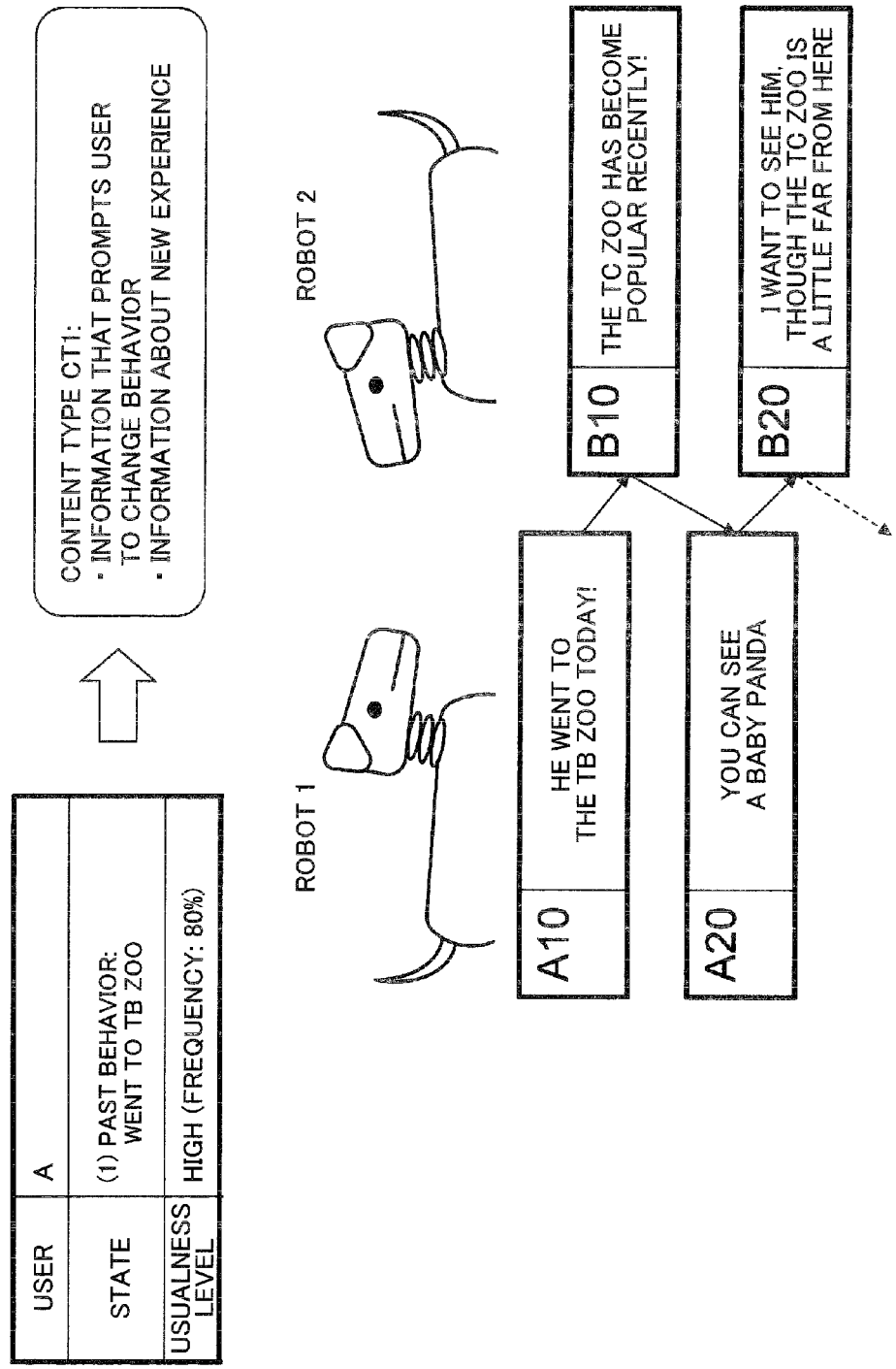
FIG. 11 is a view illustrative of a method that presents a content based on the past state of the user and the usualness level.
Figure 12:
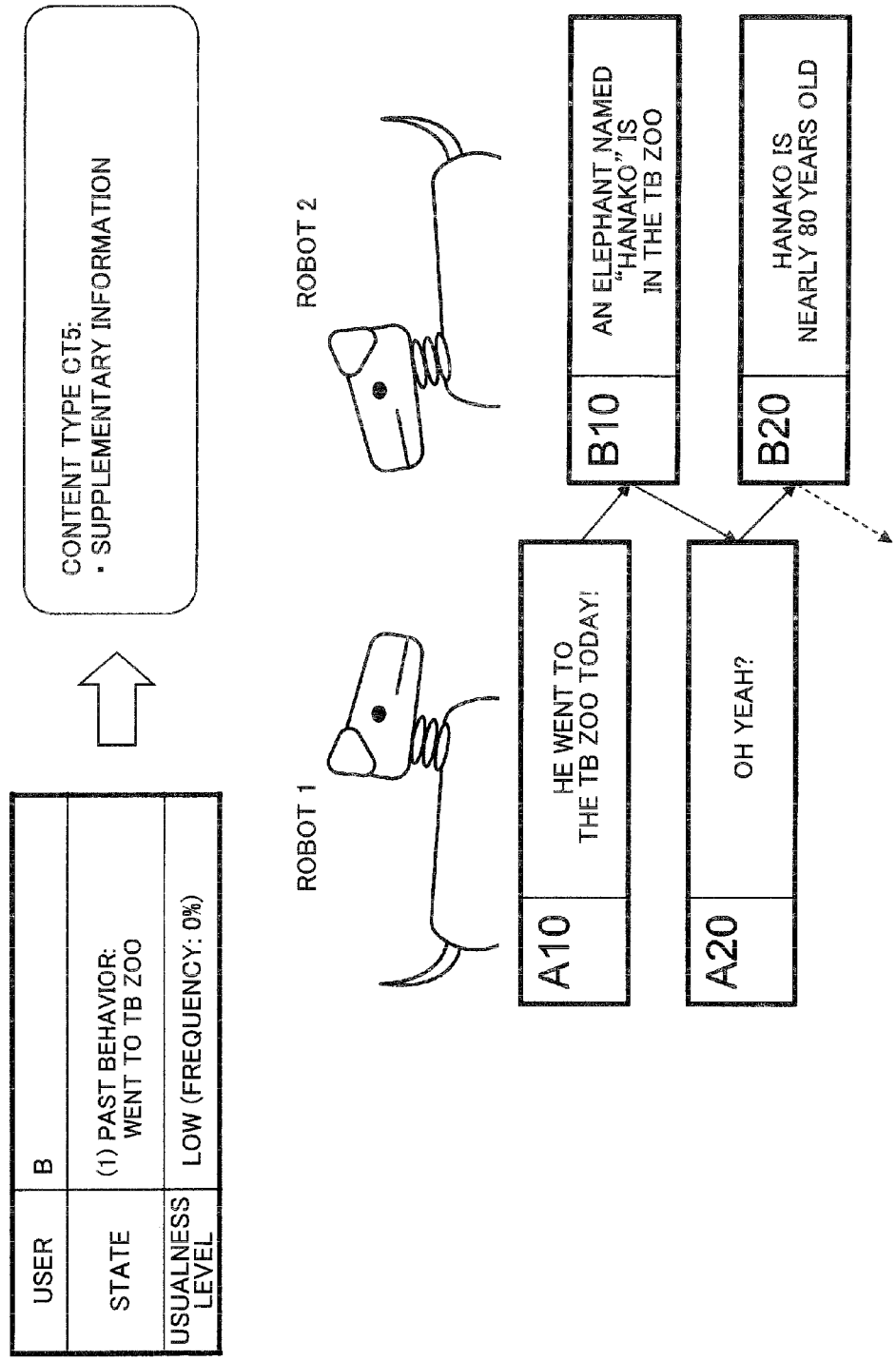
FIG. 12 is a view illustrative of a method that presents a content based on the past state of the user and the usualness level.

FIGS. 11 and 12 show examples of a method that evaluates the usualness level of the past state of the user to select the content.

In FIG. 11, a visit to the TB zoo is extracted from the state historical information as the past state (behavior) of a user A. Since the user A frequently visits the TB zoo, the usualness level of the state of the user A is determined to be high. In this case, the content type CT1 that presents information that prompts the user A to act in a different way or information about a new experience is selected. The robots 1 and 2 have a conversation based on the scenario data of the selected content type CT1.

Specifically, the robot 1 speaks "He went to the TB zoo today!", and the robot 2 speaks "The TC zoo has become popular recently!", for example. The robot 1 then speaks "You can see a baby panda", and the robot 2 speaks "I want to see him, though the TC zoo is a little far from here".

This makes it possible to prompt the user A who frequently visits the TB zoo to visit the TC zoo. If the user is prompted to a new experience, it is expected that the user will become aware of something, discover something, or get impressed by something.

In FIG. 12, the usualness level of a user A shown in FIG. 7 is evaluated as low since the user B has not visited the TB zoo. In this case, a content type CT5 that presents supplementary information is selected. The robots 1 and 2 have a conversation based on the scenario data of the selected content type CT5.

Specifically, the robot 1 speaks "He went to the TB zoo today!", and the robot 2 speaks "An elephant named "Hanako" is in the TB zoo", for example. The robot 1 then speaks "I know", and the robot 2 speaks "Hanako is nearly 80 years old".

This makes it possible to present an appropriate content corresponding to the state of the user by presenting the supplementary information about the TB zoo, taking account of a situation in which the user who visited the TB zoo for the first time could not sufficiently see animals and the like.

Figure 13:
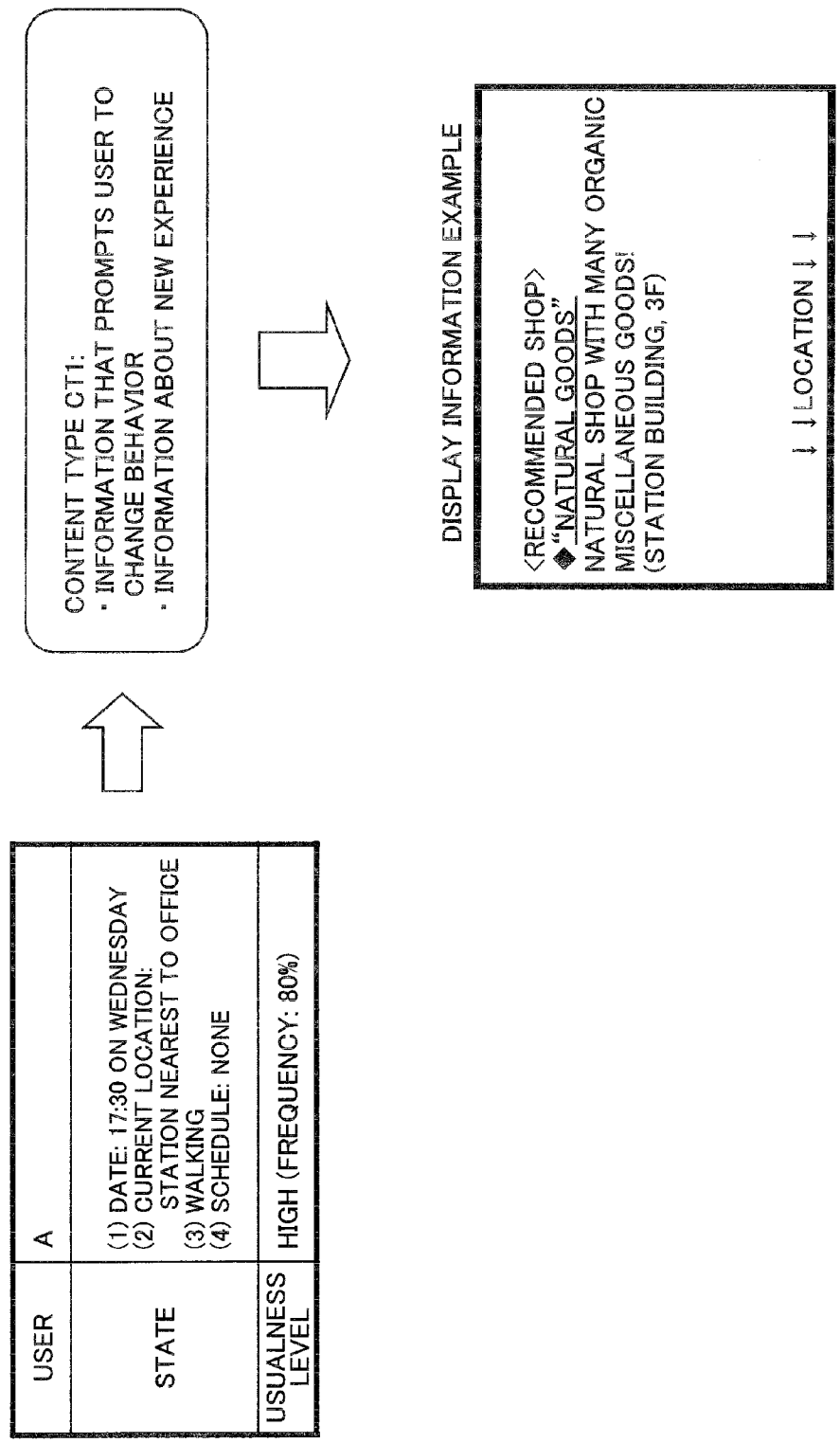
FIG. 13 is a view illustrative of a method that presents a content based on the current state of the user and the usualness level in a mobile state.
Figure 14:
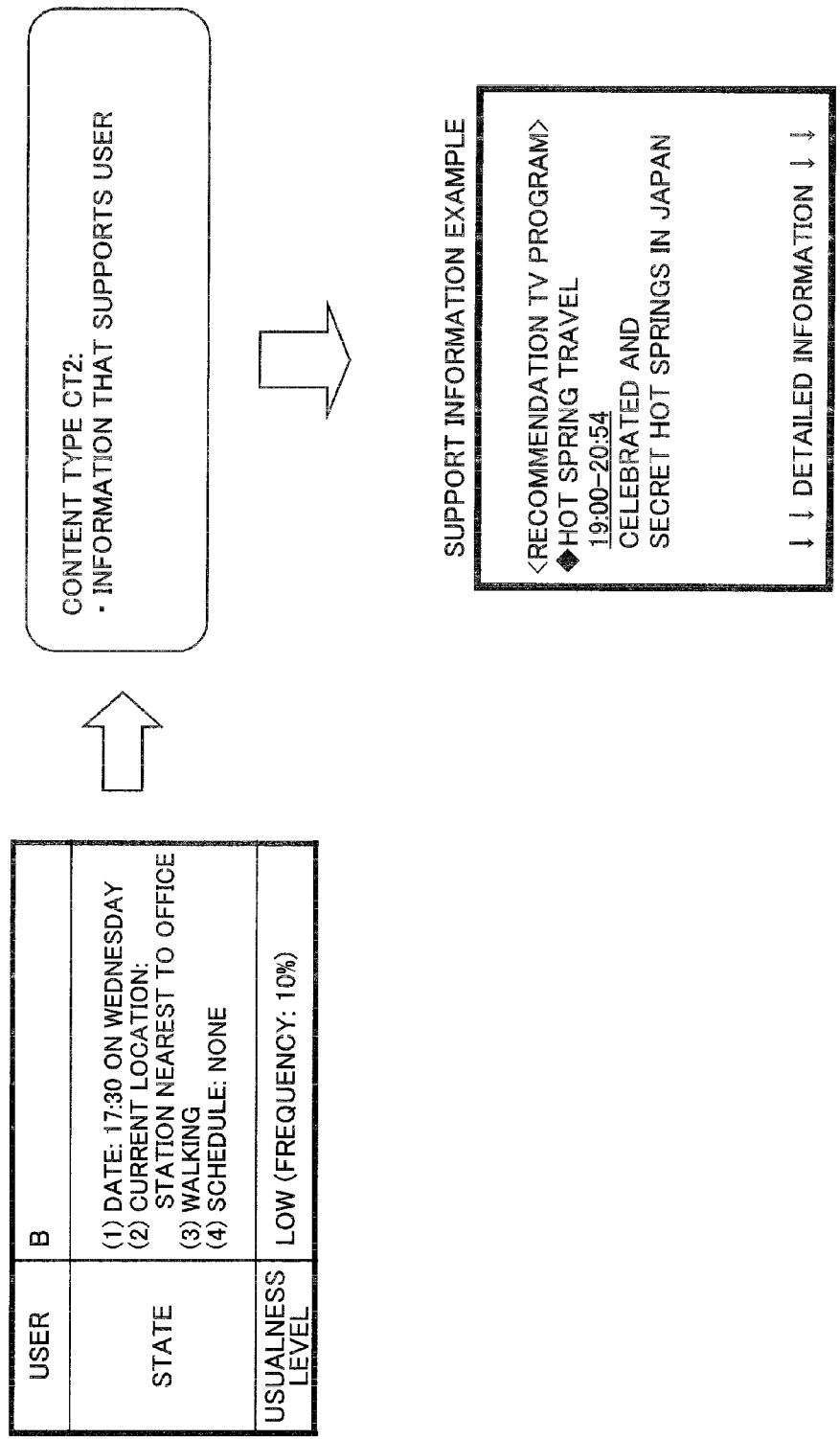
FIG. 14 is a view illustrative of a method that presents a content based on the current state of the user and the usualness level in a mobile state.

FIGS. 13 and 14 show examples of a method that evaluates the usualness level of the current state of the user when the user carries a mobile display or the like to select the content.

In FIG. 13, a user A is walking around the station nearest to the office at about 17:30 on Wednesday. The usualness level of the state of the user A who returns to the office on schedule on a weekday is determined to be high based on the state history of the user A. In this case, the content type CT1 that presents information that prompts the user A to act in a different way or information about a new experience is selected, and the content image of the selected content type CT1 is displayed on the mobile display. Specifically, information about recommended shops near the place where the user A is walking is displayed.

This makes it possible to prompt the user to visit a shop that the user has not visited so that the user can have a new experience.

In FIG. 14, a user B is walking around the station nearest to the office at about 17:30 on Wednesday. The usualness level of the state of the user B who returns to the office on schedule on a weekday is determined to be low, differing from the user A. In this case, the content type CT2 that presents information that supports the user B is selected, and the content image of the selected content type CT2 is displayed on the mobile display. Specifically, information about recommended TV programs that the user can watch after the user has returned home is displayed.

This makes it possible to prompt the user B who always comes home late to relax to support the user.

According to this embodiment, an appropriate content is selected and presented to the user based on the past, current, or future state of the user and the usualness level of the state of the user. This makes it possible to present the content corresponding to the state of the user while prompting the user to change the usual life pattern or become aware of the usual life pattern, or removing complexity or uneasiness of the user about an unusual experience, so that novel information presentation can be implemented.

5. Digital Photo Frame

The above description has been given taking an example in which the information presentation section that presents a content is a robot or a mobile display. Note that the information presentation section is not limited to a robot or a mobile display, but may be a digital photo frame or the like.

Figure 15A:
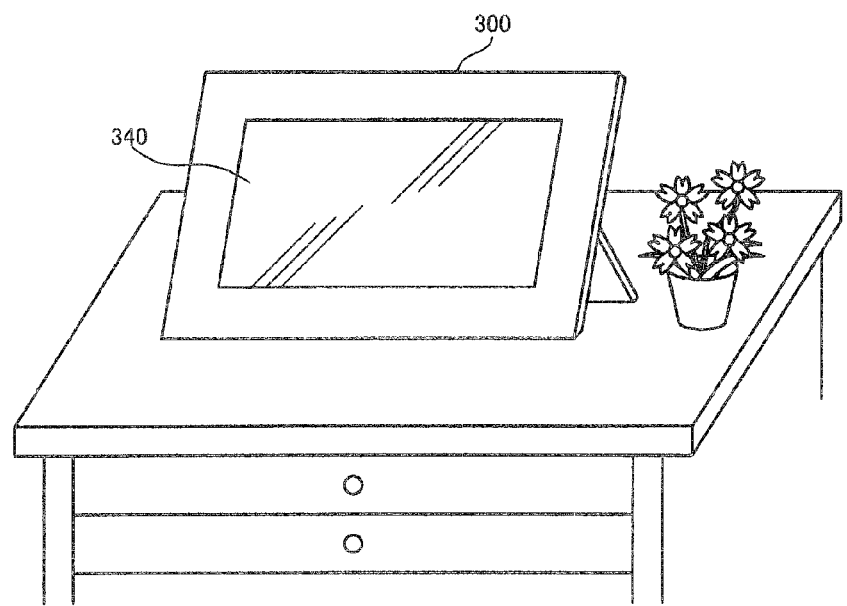
FIGS. 15A and 15B are views illustrative of a digital photo frame.

FIG. 15A shows an example of a digital photo frame 300 (digital photo player or image reproduction device). FIG. 15A shows an example of a photo stand-type digital photo frame. The digital photo frame 300 is set up by the user in an arbitrary place in a house or the like. The digital photo frame 300 reproduces (image reproduction or sound reproduction) content information (e.g., digital image data or digital sound data) stored in a content information storage section 322 of a storage section 320 (see FIG. 15B). The digital photo frame 300 can automatically reproduce the content information stored in the content information storage section 322 even if the user does not issue a reproduction instruction. The digital photo frame 300 automatically displays a photo slide show, or automatically reproduces a video, for example.

The digital photo frame 300 may be a wall-hanging digital photo frame instead of a photo stand-type digital photo frame (see FIG. 15A), for example. A content information reproduction button or the like may be provided in the digital photo frame 300, or the digital photo frame 300 may be configured so that the user can issue a reproduction instruction using a remote controller.

The digital photo frame 300 may include a memory card (e.g., SD card) interface. Alternatively, the digital photo frame 300 may include a wireless communication interface (e.g., wireless LAN or Bluetooth) or a cable communication interface (e.g., USB). For example, when the user has stored content information in a memory card and inserted the memory card into a memory card interface of the digital photo frame 300, the digital photo frame 300 automatically reproduces the content information stored in the memory card (e.g., displays a slide show). Alternatively, when the digital photo frame 300 has received content information from the outside via wireless communication or cable communication, the digital photo frame 300 reproduces the content information (automatic reproduction process). For example, when the portable electronic instrument 100 (e.g., digital camera or portable telephone) possessed by the user has a wireless communication function (e.g., Bluetooth), the content information is transferred from the content information storage section 122 of the portable electronic instrument to the content information storage section 322 of the digital photo frame 300 by utilizing the wireless communication function. The digital photo frame 300 reproduces the content information transferred from the portable electronic instrument 100.

Figure 15B:
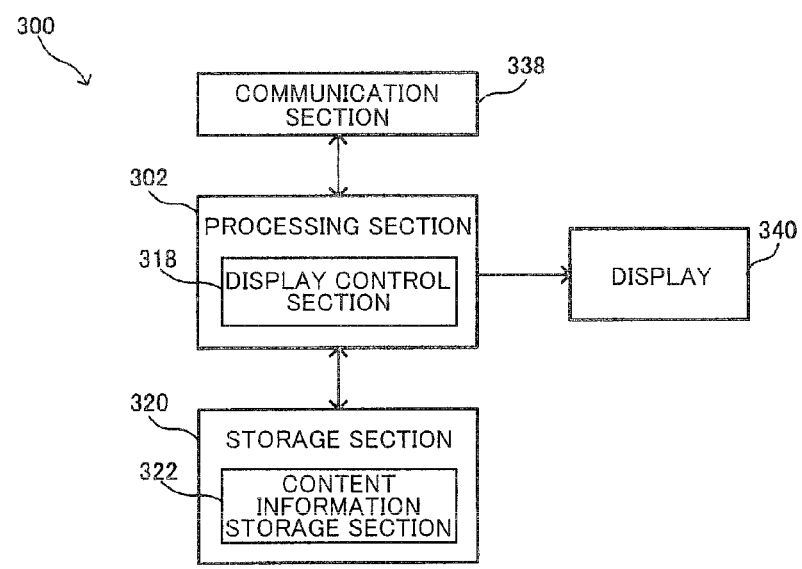

FIG. 15B shows a configuration example of the digital photo frame 300. The digital photo frame 300 includes a processing section 302 that performs various processes, a communication section 338 that implements wireless or cable communication, the storage section 320, and a display 340.

The processing section 302 may be implemented by a processor (e.g., CPU), a display control ASIC, or the like. The storage section 320 may be implemented by a RAM, an HDD, or the like. When the content information is stored in a memory card and automatically reproduced, the storage section 320 may be implemented by a memory card. The display 340 may be implemented by a liquid crystal display, a display that utilizes a light-emitting element (e.g., organic EL element), an electrophoretic display, or the like. A display control section 318 included in the processing section 302 displays an image on the display 340 based on image data (i.e., content information). For example, the display control section 318 decodes compressed image data, and reproduces the decoded image data.

An image of the content selected based on the state of the user and the usualness level of the user can be reproduced by utilizing the digital photo frame 300 shown in FIGS. 15A and 15B. For example, the content corresponding to the state of the user linked to a low usualness level can be selected and an image of the content can be reproduced. This makes it possible to prompt the user who unintentionally watches the image automatically reproduced by the digital photo frame 300 to change the usual life pattern, for example.

6. Usualness Sublevel

Examples of the evaluation target item of the usualness level include the time information, the place information about the user (environment information about the user in a broad sense), the behavior information about the user, the condition information about the user, the schedule information about the user, and the like. As shown in FIG. 16A, a total usualness level TN is evaluated based on all of the time information, the place information, the behavior information, the condition information, and the schedule information as the evaluation target items, for example.

However, the usualness level may not be appropriately evaluated by evaluating only the total usualness level TN since the state characteristic to each evaluation target item may be obscured.

In FIG. 16A, a plurality of usualness sublevels SN1 to SN6 and the like are provided in addition to the total usualness level TN. Each usualness sublevel is individually evaluated, and the content corresponding to each usualness sublevel is displayed.

For example, the usualness sublevel SN1 is evaluated based on the probability that the user stays in a given place at a given time, for example. The usualness sublevel SN2 is evaluated based on the probability that the user is scheduled to do something at a given time, for example. The usualness sublevel SN3 is evaluated based on the probability that the user performs a given behavior at a given time, for example. The usualness sublevel SN4 is evaluated based on the probability that the user performs a given behavior in a given place, for example. The usualness sublevel SN5 is evaluated based on the probability that the user performs a given behavior in a given place at a given time, for example. The usualness sublevel SN6 is evaluated based on the probability that the user is scheduled to do something in a given place at a given time, for example. Note that a usualness sublevel that utilizes information other than the time information, the place information, the behavior information, the condition information, and the schedule information as the evaluation target item may be provided. The number of evaluation target items of each usualness sublevel may be one, or may be two or more.

In this embodiment, the evaluation result for the usualness level differs corresponding to the usualness sublevel. The type of content to be presented is determined corresponding to the evaluation target item used. The information corresponds to the evaluation target item. For example, when presenting the content based on the usualness sublevel SN1, a content that relates to the place of stay (current location) of the user is selected and presented. When presenting the content based on the usualness sublevel SN2, a content that relates to the schedule of the user is selected and presented.

In FIG. 16A, the usualness sublevels differ in evaluation target item. For example, the usualness sublevel SN1 (first usualness sublevel in a broad sense) and the usualness sublevel SN2 (second usualness sublevel in a broad sense) differ in evaluation target item. Specifically, the evaluation target items (first evaluation target items) of the usualness sublevel SN1 include the time information and the place information about the user, and the evaluation target items (second evaluation target items) of the usualness sublevel SN2 include the time information and the schedule information about the user. The first evaluation target items and the second evaluation target items differ at least partially.

When selecting the content based on the usualness sublevel SN1, a content corresponding to the first evaluation target items (i.e., the evaluation target items of the usualness sublevel SN1) is selected (e.g., a content corresponding to the place information about the user is selected).

For example, when it has been determined that the user usually stays in a given place at a given time based on the usualness sublevel SN1, a content that prompts the user to unusual behavior and relates to the given place is selected and presented. For example, a content that presents a shop that the user has not visited and is located near the given place is presented, as described with reference to FIG. 13.

When it has been determined that the user rarely stays in the given place at the given time based on the usualness sublevel SN1, a content that prompts the user to usual behavior and relates to the given place is selected and presented. For example, when the user has made a business trip to a foreign city that the user visited for the first time, a content that presents a fast-food shop or the like that is familiar in Japan and is located in the foreign city is presented.

When selecting the content based on the usualness sublevel SN2, a content corresponding to the second evaluation target items (i.e., the evaluation target items of the usualness sublevel SN2) is selected (e.g., a content corresponding to the schedule information about the user is selected).

For example, when it has been determined that the user is usually scheduled to do a given task at a given time based on the usualness sublevel SN2, a content that prompts the user to unusual behavior and relates to the given task is selected and presented. For example, a content that presents a nice shop in Osaka that the user has not visited and relates to a business trip to Osaka, is presented to the user who is usually scheduled to make a business trip to Osaka, as described with reference to FIG. 9.

When it has been determined that the user is rarely scheduled to do the given task at the given time based on the usualness sublevel SN2, a content that prompts the user to usual behavior and relates to the given task is selected and presented. For example, a content that presents a standard shop in Osaka that reassures the user and relates to a business trip to Osaka is presented to the user who is scheduled to make a first business trip to Osaka, as described with reference to FIG. 10.

An appropriate content corresponding to the state of the user and the usualness level can be selected by appropriately selecting the usualness sublevel when selecting the content.

When selecting the content based on the usualness sublevel, it is desirable to provide a usualness sublevel table corresponding to each usualness sublevel, as shown in FIG. 16B. FIG. 16B shows a table for the usualness sublevel SN1 and a table for the usualness sublevel SN2, for example.

In the table for the usualness sublevel SN1, a content is linked to each combination of the time, place, and usualness level. In the table for the usualness sublevel SN2, a content is linked to each combination of the time, schedule, and usualness level.

An appropriate content can be selected and presented to the user by a simple system configuration based on the state (e.g., time, place, and behavior) of the user, the usualness level of the state of the user, and the table for each usualness sublevel shown in FIG. 16B. A table to be used may be randomly determined, or may be may determined by given sequence control.

7. Spot and Area

In order to provide an appropriate and timely content to the user, it is desirable to locate the position of the user using the GPS sensor or the like, and select and present a content based on the located position.

However, position data (latitude and longitude) obtained by the GPS sensor is not information that directly indicates the place of stay of the user. Therefore, it is necessary to extract a place meaningful to the user from the position data.

Figure 17:
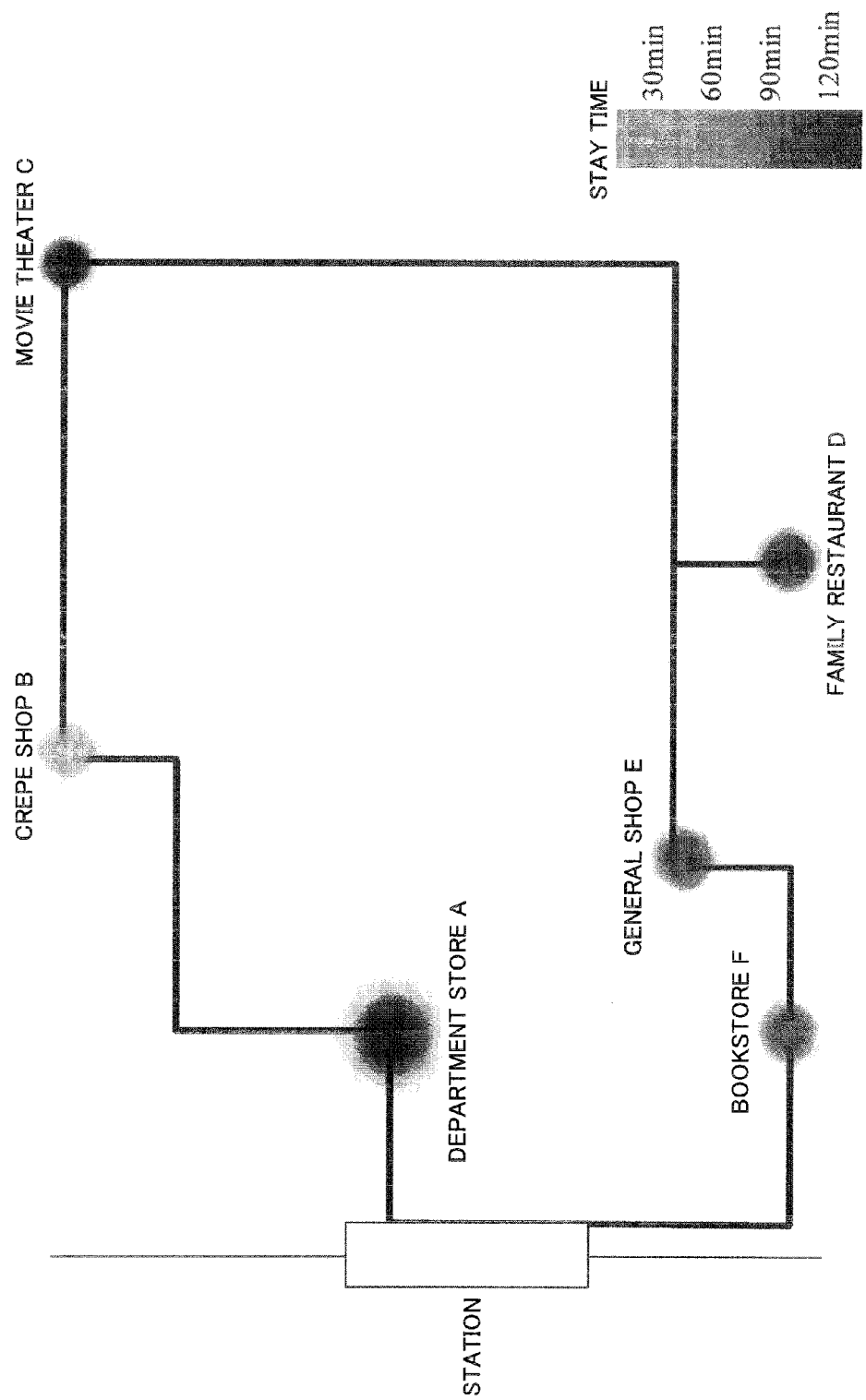
FIG. 17 is a view illustrative of the position distribution in the place of stay of the user.

For example, a place meaningful to the user can be extracted by categorizing the place of stay of the user based on the stay time. FIG. 17 shows a heat map when the user who arrived at Shinjuku station or the like walked around the station, and stayed in a department store A, a crepe shop B, a movie theater C, a family restaurant D, a general shop E, and a bookstore F, for example. The distribution of the position of the user in each place of stay can be determined by utilizing the GPS sensor or the like. The size and the density of the distribution differ corresponding to the place of stay. In the heat map shown in FIG. 17, a place where the user stayed for a long time is densely displayed, and the distribution of the place corresponds to the behavior of the user.

As shown in FIG. 17, a plurality of places (e.g., department store A, crepe shop B, and movie theater C) that have different meanings for the user are located in a city such as Shinjuku. In FIG. 17, a content meaningful to the user cannot be presented by merely determining that the place of stay of the user is Shinjuku, and selecting and presenting a content that relates to Shinjuku. Specifically, when the user stays in the department store A, it is necessary to present floor information and sale information about the department store A. When the user stays in the crepe shop B, it is necessary to present information about a recommended crepe of the crepe shop B. When the user stays in the movie theater C, it is necessary to present screen time information and floor information about the movie theater. However, timely information corresponding to the place of stay of the user cannot be provided by merely determining that the user is in Shinjuku.

On the other hand, when the user visits a place (e.g., sightseeing spot) where the user takes a walk without staying in a specific place for a long time, a place meaningful to the user may not be extracted when a narrow area is determined. For example, when the user visits Mt. Takao, it is considered that the user takes a walk around various places near Mt. Takao. Therefore, the user moves over a wide range, differing from FIG. 17. Therefore, if the range of stay of the user is specified within a narrow range as shown in FIG. 17, it is impossible to extract that the user visits Mt. Takao so that a content that relates to Mt. Takao cannot be presented to the user.

Therefore, FIGS. 18A and 18B employ an area/spot concept as the place of stay of the user. As shown in FIG. 18A, the area is larger than the spot. As shown in FIG. 18A, a spot that is smaller than the area is situated in each area. The spot and the area may be extracted by the following method.

For example, the area is an area for which the position standard deviation σ within a given period T1 is equal to or less than a first threshold value Sth1 (several hundreds to 1000 m). The spot is an area for which the position standard deviation σ within a given period T2 is equal to or less than a second threshold value Sth2 (e.g., several tens to 100 m). In this embodiment, the area and the spot are extracted by statistically processing information obtained by a position detection sensor such as the GPS sensors worn by the user. Specifically, whether the user stays within the area or the spot is determined based on the standard deviation σ of the position of the user within a given period.

Suppose that the average latitude/longitude and the standard deviation within the given period T1 (e.g., four hours) are (Nµ, Eµ) and (Nσ, Eσ). In this case, an area meaningful to the user shown in FIG. 18A can be extracted by converting the standard deviation (Nσ, Eσ) into distance, and extracting an area in which the north-to-south and east-to-west standard deviations are equal to or less than the threshold value Sth1 (e.g., 1 km). The spot shown in FIG. 18B can be extracted by performing a process similar to the above process while reducing the distance threshold value Sth to Sth2 (e.g., several tens of meters).

According to this embodiment, whether or not the user stays within the area is determined based on whether or not the standard deviation σ of the position of the user within the given period T1 is equal to or less than the first threshold value Sth1. On the other hand, whether or not the user stays within the spot is determined based on whether or not the standard deviation σ of the position of the user within the given period T2 is equal to or less than the second threshold value Sth2.

For example, the position standard deviation σ is calculated by statistically processing the position (latitude and longitude) of the user from a time (t−T1) to a time t. When the calculated standard deviation σ is equal to or less than the first threshold value Sth1, it is determined that the user stayed within the area in the time zone from the time (t−T1) to the time t. Likewise, the position standard deviation σ is calculated by statistically processing the position of the user from a time (t−T2) to the time t. When the calculated standard deviation σ is equal to or less than the second threshold value Sth2, it is determined that the user stayed within the spot in the time zone from the time (t−T2) to the time t. Note that T1 may be equal to T2. The area and the spot may be extracted by observing the position of one user for a long time and statistically processing the position of the user, or may be extracted by observing the positions of a plurality of users and statistically processing the positions of the users.

The extent of each of a plurality of areas may be variably set, and the extent of each of a plurality of spots may also be variably set. This may be implemented by variably setting the first threshold value Sth1 corresponding to each area, and variably setting the second threshold value Sth2 corresponding to each spot.

Figure 19:
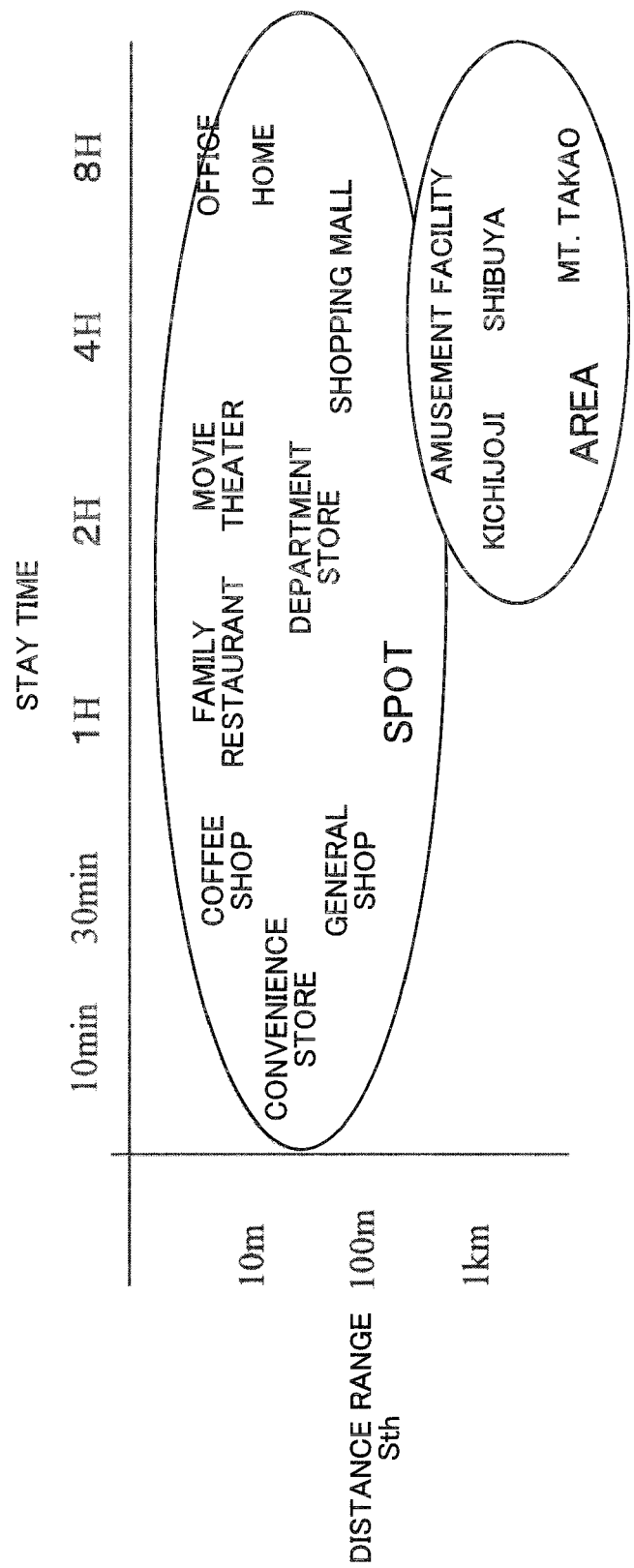
FIG. 19 is a view showing a stay time and a distance range of each spot and each area.

As shown in FIG. 19, the distance range (i.e., the extent of the spot or area) and the average stay time differ corresponding to each spot and each area, for example. Therefore, the properties of the spot and the area can be categorized to some extent by appropriately setting the distance range and the stay time. Specifically, since the granularity of the area differs corresponding to the place and the category, such categorization is effective for selection of the content based on the place of stay of the user. In FIG. 19, the distance range (i.e., the extent of the spot) and the stay time of a coffee shop are respectively about 10 m and about 30 minutes, for example. The distance range and the stay time of a movie theater are respectively about 10 m and about two hours (i.e., longer than that of the coffee shop). The distance range and the stay time of a general shop are respectively about 100 m (i.e., larger than that of the coffee shop) and about 30 minutes. The stay time of a shopping mall is about four hours. The distance range of the area increases as compared with the spot (i.e., the extent of the area increases), and the stay time of the area also relatively increases. The meaning of the place that cannot be extracted based on only the position data can be extracted by appropriately setting the distance range (area of the spot and the area) and the stay time.

In FIG. 19, spots such as a coffee shop, a family restaurant, a movie theater, an office, a home, and a convenience store can be extracted by setting the threshold value Sth2 to about several to several tens of meters, for example. Spots such as a general shop, a department store, and a shopping mall can be extracted by setting the threshold value Sth2 to about several tens to several hundreds of meters. Spots such as an amusement facility (e.g., amusement park) can be extracted by further increasing the threshold value Sth2.

Areas such as Kichijoji and Shibuya can be extracted by setting the threshold value Sth1 to about 1 to 10 km. Areas such as Mt. Takao can be extracted by further increasing the threshold value Sth1.

The extent of each area and each spot can be variably set by thus variably setting the threshold values Sth1 and Sth2. Therefore, a place meaningful to the user can be extracted from the position data.

Figure 20:
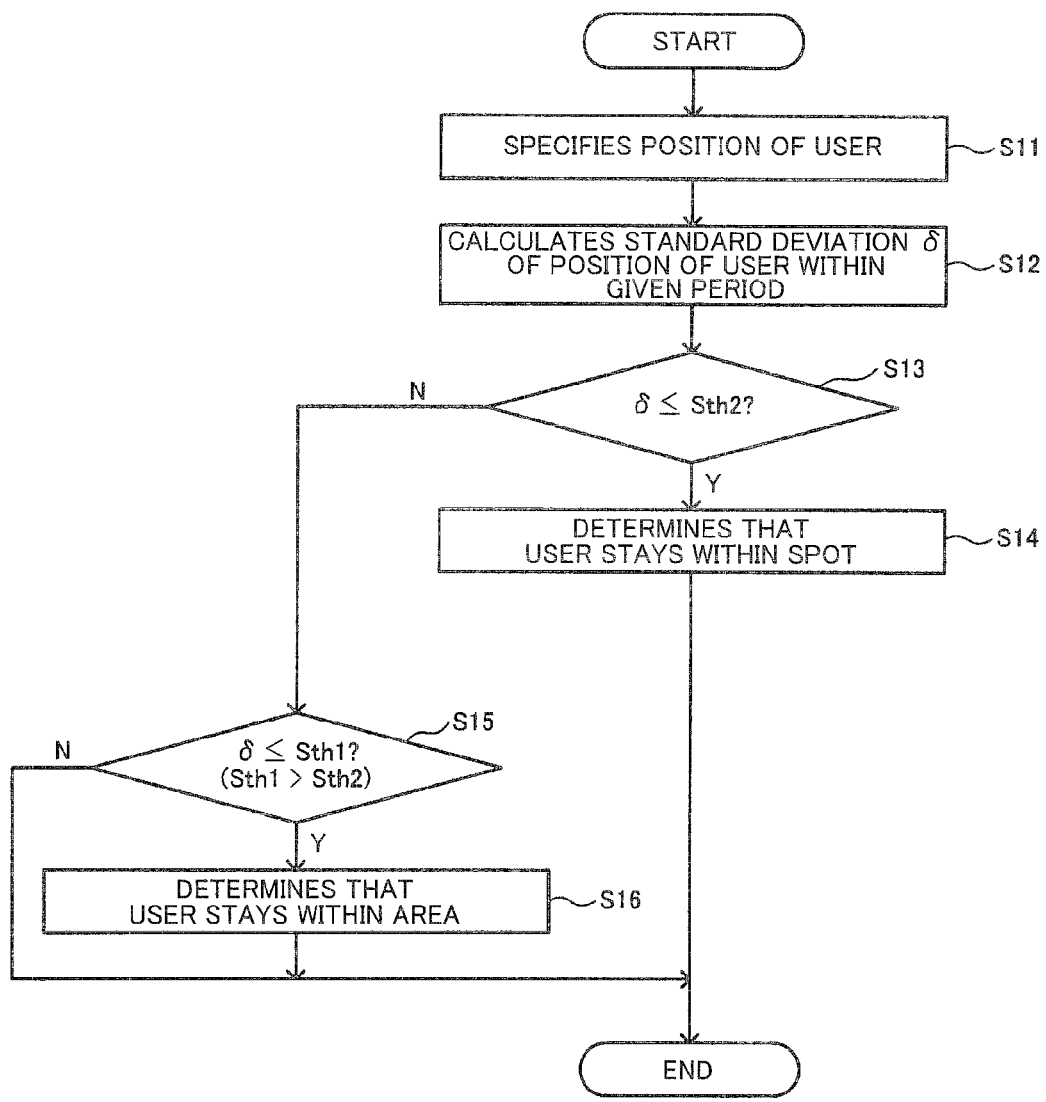
FIG. 20 is a flowchart illustrative of process that specifies the place of stay of the user.

FIG. 20 is a flowchart showing a process that specifies a spot or an area where the user stays.

The position of the user is specified based on the information from the GPS sensor or the like (step S11). The standard deviation σ of the position of the user within a given period is calculated (step S12).

Whether or not the standard deviation σ is equal to or less than the threshold value Sth2 for the spot is determined (step S13). When the standard deviation σ is equal to or less than the threshold value Sth2, it is determined that the user stays within the spot (step S14). When the standard deviation σ is greater than the threshold value Sth2, whether or not the standard deviation σ is equal to or less than the threshold value Sth1 for the area is determined (step S15). When the standard deviation σ is equal to or less than the threshold value Sth1, it is determined that the user stays within the area (step S16).

Figure 21:
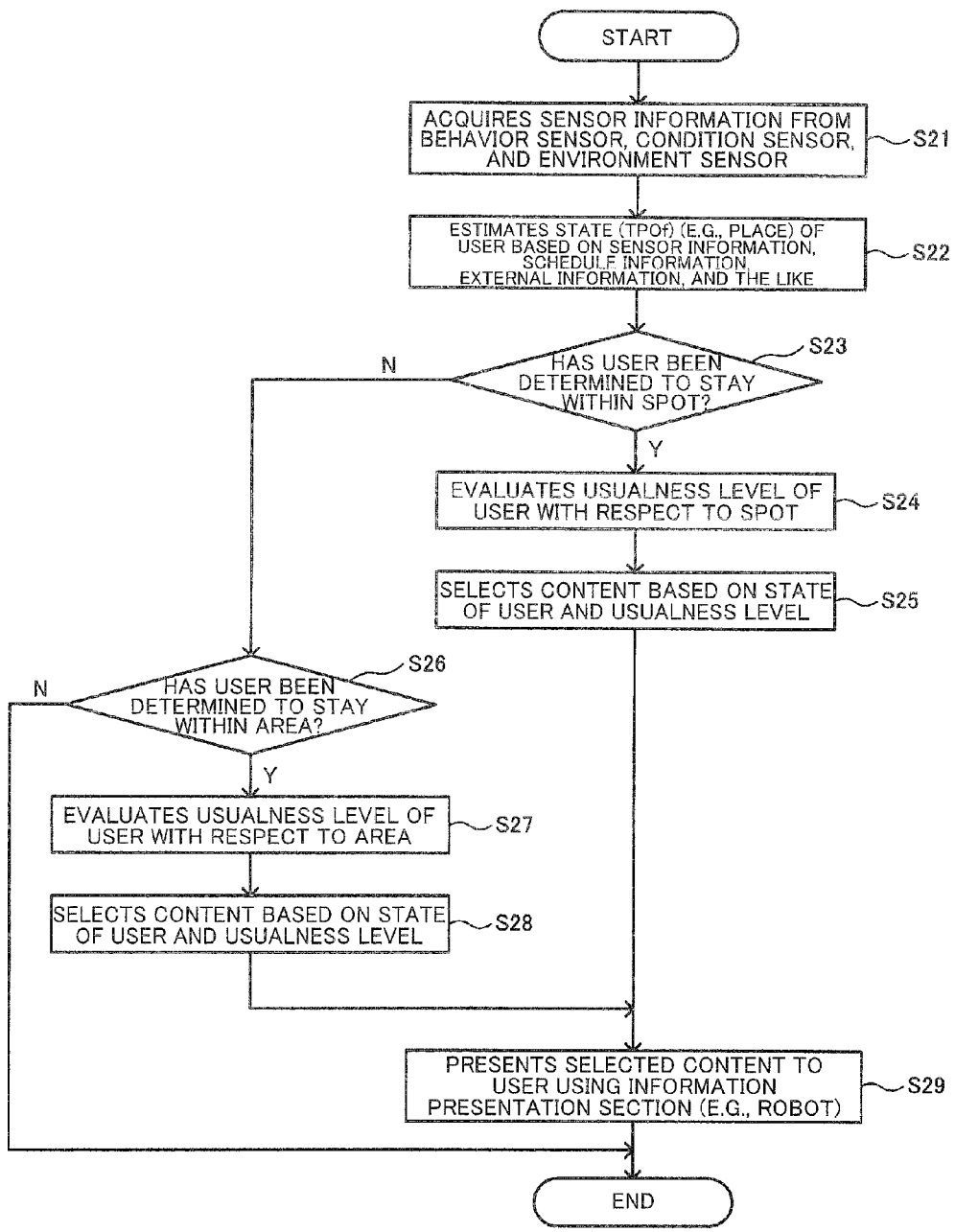
FIG. 21 is a flowchart illustrative of a content selection processing based on the usualness level.

FIG. 21 is a flowchart showing a process that evaluates the usualness level based on the spot or area where the user stays, and selects the content based on the usualness level evaluation result.

The sensor information from the behavior sensor or the like is acquired, and the state of the user (e.g., the place of stay) is estimated (steps S21 and S22). When it has been determined that the user stays within a spot, the usualness level of the user with respect to that spot is evaluated (steps S23 and S24). Specifically, the usualness level of stay of the user within that spot is determined from the stay history and the like. A content is then selected based on the state of the user and the usualness level of the user with respect to the spot, and the selected content is presented to the user using the information presentation section 142 (steps S25 and S29).

When the user does not stay within a spot, whether or not the user stays within an area is determined (steps S26). When it has been determined that the user stays within an area, the usualness level of the user with respect to that area is evaluated (step S27). Specifically, the usualness level of stay of the user within that area is determined from the stay history and the like. A content is then selected based on the state of the user and the usualness level of the user with respect to the area, and the selected content is presented to the user using the information presentation section 142 (steps S28 and S29).

For example, when the usualness level of the user with respect to the spot or area where the user stays is high, a content that is not familiar to the user is selected and presented to the user to prompt the user to unusual behavior. On the other hand, when the usualness level of the user with respect to the spot or area where the user stays is low, a content that is familiar to the user is selected and presented to the user to reassure or support the user.

For example, suppose that the user has been specified to stay within the spot corresponding to the office in the daytime on a weekday. In this case, the usualness level of the user is determined to be high since the user usually stays in the office in the daytime on a weekday. Therefore, a content that prompts the user to unusual behavior is presented. Specifically, when presenting a lunch guide content to such a user, information about a restaurant that the user rarely visits or has not visited is presented to the user, for example.

Suppose that the user has been specified to stay within the area corresponding to a foreign sightseeing spot that the user visited for the first time in the daytime on a holiday. In this case, the usualness level of the user is determined to be low (unusual), since the state of the user is unusual. Therefore, a content that reassures or supports the user is presented to the user. Specifically, when presenting a lunch guide content to such a user, information about a fast-food shop or a chain store that the user usually visits in Japan is presented to the user, for example.

When the user stays within a spot within an area, the usualness level of the user with respect to the area and the usualness level of the user with respect to the spot may be evaluated. A content may be selected based on the usualness level with respect to the area, and a content may also be selected based on the usualness level with respect to the spot. When the user stays in a place within an area other than a spot, only the usualness level of the user with respect to the area may be evaluated, and a content may be selected based on the usualness level with respect to the area. For example, when the user has been determined to stay within a spot within an area, a content is selected based on the usualness level of the user with respect to the spot. When the user has been determined to stay within a place within an area other than a spot, a content is selected based on the usualness level of the user with respect to the area (i.e., the content is selected while giving priority to the usualness level of the user with respect to the area). Specifically, when a spot where the user stays has been specified, a content is selected based on the usualness level of the user with respect to that spot, and a content is selected based on the usualness level of the user with respect to the area when a spot where the user stays has not been specified.

The usualness level can be more appropriately evaluated by employing the method that separately evaluates the usualness level with respect to the area and the usualness level with respect to the spot.

For example, if the usualness level of the user in Shinjuku where the user's office is situated is determined based on a large area, whether the user is in the office or a hotel near the office cannot be determined. Specifically, since a plurality of places that differ in meaning are present in a single area, the usualness level may not be accurately evaluated.

On the other hand, when the user visits a place (e.g., sightseeing spot) where the user takes a walk without staying in a specific place for a long time, a place meaningful to the user may not be extracted when using a narrow area (e.g., spot) so that the usualness level may not be evaluated.

In FIG. 21, whether the user stays within an area or a spot within an area is determined. When the user stays within an area, the usualness level of the user with respect to the area is determined. When the user stays within a spot, the usualness level of the user with respect to the spot is determined. Therefore, since the usualness level can be evaluated corresponding to each spot that is smaller than the area and has a different meaning for the user, the usualness level can be evaluated more accurately and appropriately. When a small area (e.g., spot) that is meaningful to the user cannot be extracted, the usualness level can be evaluated corresponding to each area that is larger than the spot and has a different meaning for the user.

Note that the usualness level may be evaluated in various ways. For example, the usualness level of the user with respect to the place of stay (e.g., area or spot) may be evaluated based on the probability that the user stays in each place.

In FIG. 22, the probability that the user stays at home in the daytime on a weekday is low, while the probability that the user stays at home in the morning and night on a weekday is high. The probability that the user stays at home in the daytime on a holiday increases to some extent, and the probability that the user stays at home in the morning and night on a holiday further increases.

The probability that the user stays in the office in the daytime on a weekday is high while the probability that the user stays in the office in the morning and night on a weekday is low. The probability that the user stays in the office on a holiday is low.

As shown in FIG. 23A, the probability obtained in FIG. 22 may be assigned to a usualness level N (i.e., a value used to calculate the usualness level). The usualness level may be calculated based on the probability while taking account of the state, emotion, and the like.

For example, the usualness level of the user with respect to each place may be evaluated by normalizing the stay time in each area and each spot by the average stay time in each place. This prevents a situation in which the usualness level with respect to a convenience store or the like where the user stays for a short time is calculated to be low.

As shown in FIG. 23B, the usualness level N may be calculated based on the probability that is defined based on the number of times that the user was present in a spot or an area within a given period (e.g., 1 to 3 months).

8. Another Example of Usualness Level Evaluation Process

Figure 24:
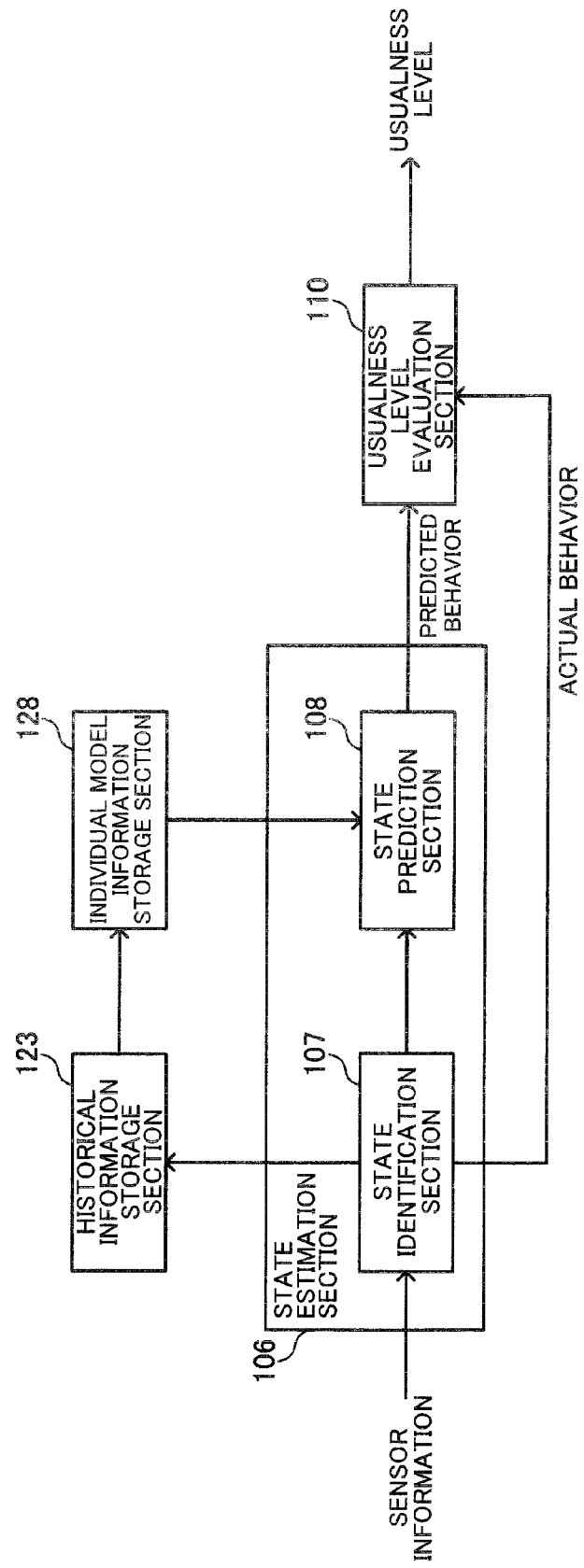
FIG. 24 is a view illustrative of another example of the usualness level evaluation process.

Another example of the usualness level evaluation process is described below with reference to FIG. 24, etc. In FIG. 24, the state estimation section 106 includes a state identification section 107 and a state prediction section 108.

The state identification section 107 identifies (estimates) the state (e.g., behavior, condition, and environment) of the user based on the sensor information from the behavior sensor, the condition sensor, and the environment sensor, and the like. The historical information (log information) about the state of the user is stored in the historical information storage section 123. The hobby, the preference, the behavior tendency, and the like of the user are constructed as an individual model by analyzing the state historical information stored in the historical information storage section 123, and the individual model is stored in an individual model information storage section 128 (individual model database).

A probability model may be used as the individual model. Examples of the probability model include a hidden Markov model. In the hidden Markov model (HMM), the system assumes that the parameter is an unknown Markov process, and estimates the unknown parameter from observable information. Specifically, the HMM is a probability model that estimates the state transition inside the system from the symbol probability distribution on the assumption that a system has an internal state that transitions according to the Markov process, and stochastically outputs a symbol corresponding to each state. Since only a symbol series can be externally observed, and the internal state transition cannot be directly observed, this probability model is referred to as a "hidden" probability model.

The state prediction section 108 predicts the subsequent behavior (state in a broad sense) of the user based on the individual model information (state historical information). The state identification section 107 identifies the actual behavior of the user. The usualness level evaluation section 110 determines the degree of coincidence between the identified actual behavior of the user and the behavior of the user predicted based on the preceding state and the individual model to evaluate the usualness level.

Figure 25A:
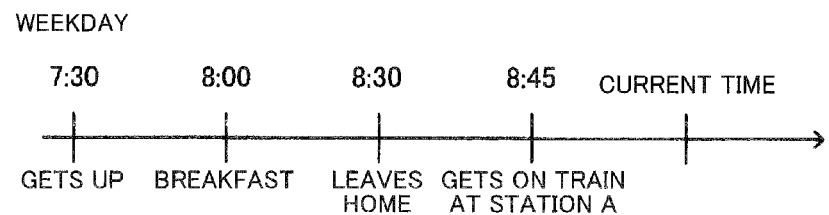
FIGS. 25A to 25D are views illustrative of another example of the usualness level evaluation process.
Figure 25B:
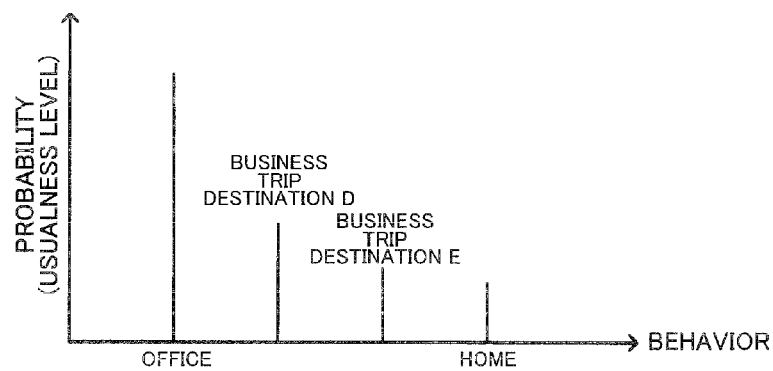

The usualness level evaluation method shown in FIG. 24 is described below with reference to FIGS. 25A to 25D. FIG. 25A shows an example of the state history (behavior history) of the user on a weekday. On a weekday, the user gets up at 7:30 AM, has breakfast at 8:00 AM, leaves home at 8:30 AM, and gets on a train at the station A near home at 8:45 AM. The state prediction section 108 predicts the subsequent behavior of the user based on the state history of the user.

The state prediction section 108 predicts that the user goes to the office with the highest probability (see FIG. 25B) based on the state history shown in FIG. 25A. When the actual behavior of the user identified by the state identification section 107 is going to the office, the usualness level evaluation section 110 evaluates that the usualness level of the user is high. When the user has immediately returned home due to an emergency or the like (i.e., the identified actual behavior of the user is coming home), the usualness level evaluation section 110 evaluates that the usualness level of the user is low (i.e., unusual).

Figure 25C:
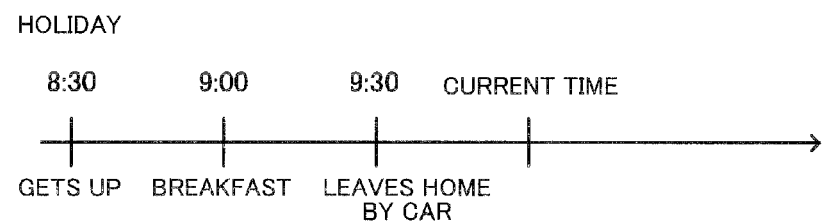
Figure 25D:
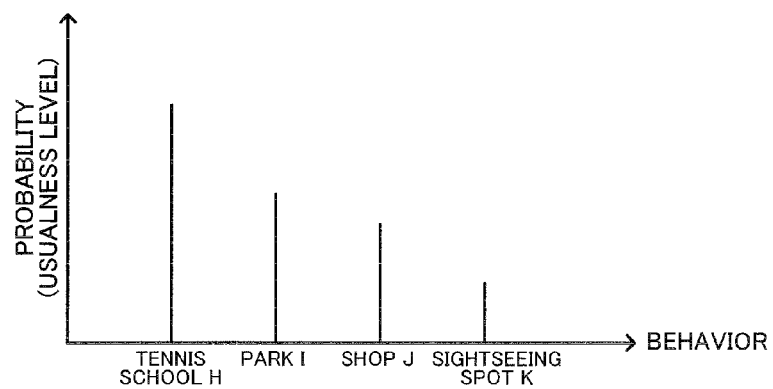

FIG. 25C shows an example of the state history of the user on a holiday. On a holiday, the user gets up at 8:30 AM, has breakfast at 9:00 AM, and leaves home by car at 9:30 AM. The state prediction section 108 predicts the subsequent behavior of the user based on the state history of the user.

The state prediction section 108 predicts that the user goes to a tennis school H with the highest probability (see FIG. 25D) based on the state history shown in FIG. 25C. When the actual behavior of the user identified by the state identification section 107 is going to the tennis school H, the usualness level evaluation section 110 evaluates that the usualness level of the user is high. On the other hand, when the user went to a sightseeing spot K distant from the center of the city, the usualness level evaluation section 110 evaluates that the usualness level of the user is low (i.e., unusual).

9. State Historical Information

A specific example of the state historical information about the user is described below.

Figure 26:
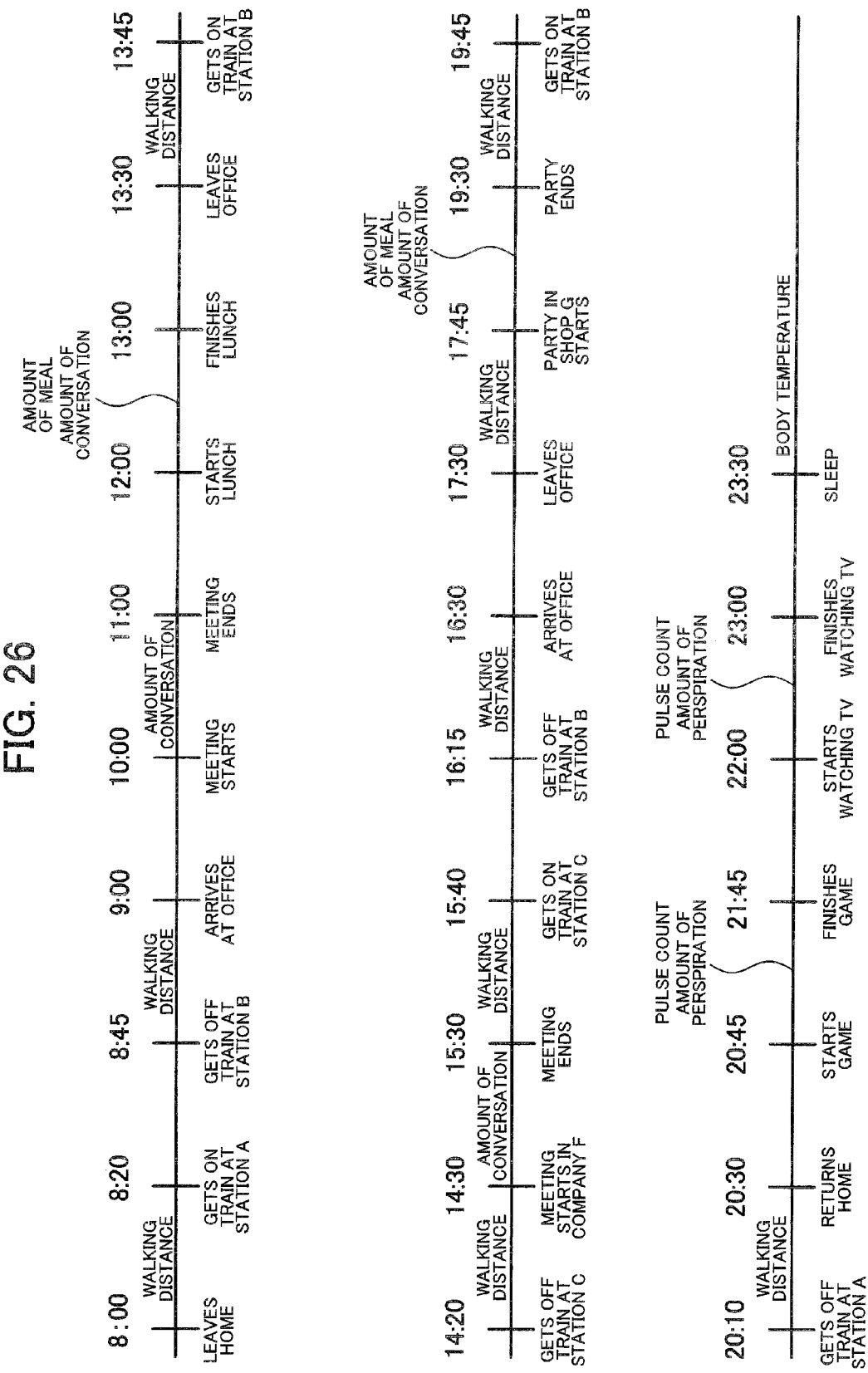
FIG. 26 is a view illustrative of state historical information about the user.

FIG. 26 schematically shows a specific example of the state historical information. The state historical information shown in FIG. 26 has a data structure in which the state (e.g., behavior) history of the user is linked to the time zone, time, and the like. For example, the user leaves home at 8:00 AM, walks from home to the station in the time zone from 8:00 AM to 8:20 AM, and arrives at a station A nearest to home at 8:20 AM. The user takes a train in the time zone from 8:20 AM to 8:45 AM, gets off the train at a station B nearest to the office at 8:45 AM, arrives at the office at 9:00 AM, and starts working. The user holds a meeting with colleagues in the time zone from 10:00 AM to 11:00 AM, and has lunch in the time zone from 12:00 PM to 13:00 PM.

In FIG. 26, the state historical information is constructed by linking the state (e.g., behavior) history of the user estimated based on the sensor information and the like to the time zone, time, and the like.

In FIG. 26, the measured values (e.g., amount of conversation, amount of meal, pulse count, and amount of perspiration) measured by the sensor and the like are also linked to the time zone, time, and the like. For example, the user walks from home to the station A in the time zone from 8:00 AM to 8:20 AM. The walking distance by the user in the time zone is measured by the sensor, and linked to the time zone from 8:00 AM to 8:20 AM. In this case, a measured value indicated by sensor information other than the walking distance, such as walking speed, amount of perspiration, and the like may be further linked to the time zone. This makes it possible to determine the amount of exercise of the user and the like in the time zone.

The user holds a meeting with colleagues in the time zone from 10:00 AM to 11:00 AM. The amount of conversation in the time zone is measured by a sensor, and linked to the time zone from 10:00 AM to 11:00 AM. In this case, a measured value indicated by sensor information (e.g., voice condition and pulse count) may be further linked to the time zone. This makes it possible to determine the amount of conversation and the tension level of the user in the time zone.

The user plays a game and watches a TV in the time zone from 20:45 to 21:45 and the time zone from 22:00 to 23:00. The pulse count and the amount of perspiration in these time zones are linked to these time zones. This makes it possible to determine the excitement level of the user and the like in these time zones.

The user sleeps in the time zone from 23:30. A change in body temperature of the user in the time zone is linked to the time zone. This makes it possible to determine the health condition of the user during sleep.

Note that the state historical information is not limited to that shown in FIG. 26. For example, the state historical information may be created without linking the state (e.g., behavior) history of the user to the date, time, and the like.

10. Modification

Figure 27:
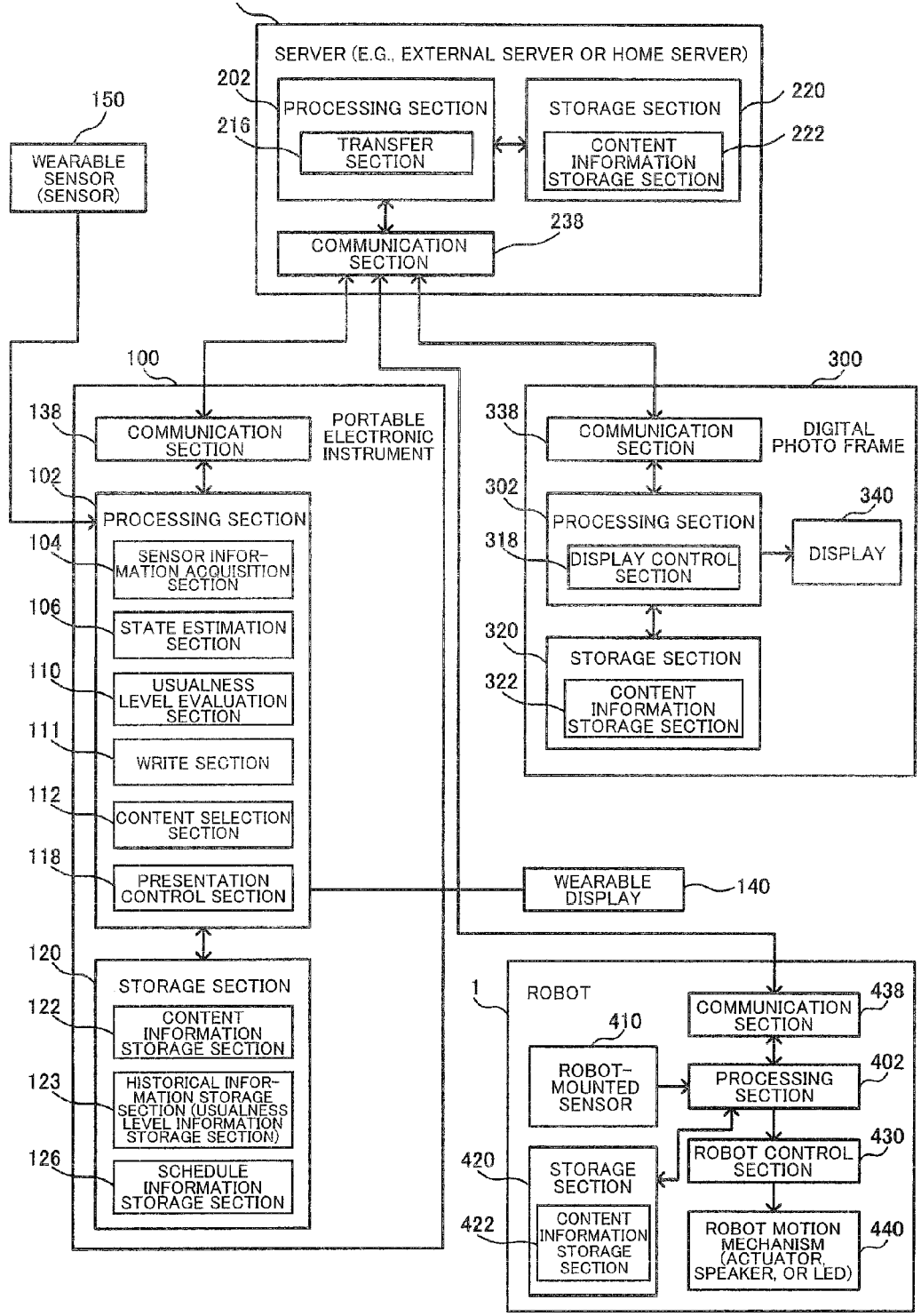
FIG. 27 shows a modification of one embodiment of the invention.

FIG. 27 shows the configuration of a modification of this embodiment. A system shown in FIG. 27 includes a server 200 (e.g., external server or home server). The portable electronic instrument 100 and the server 200 are connected via the Internet, a wireless LAN, or the like.

In FIG. 27, the portable electronic instrument 100 carried by the user mainly acquires the sensor information, estimates the state of the user, evaluates the usualness level, writes the state of the user and the usualness level, and selects the content. A transfer section 216 of a processing section 202 of the server 200 mainly downloads and transfers the content, for example.

The content is presented to the user using the wearable display 140, the display 340 of the digital photo frame 300, or the robot 1.

For example, when the user goes out while carrying the portable electronic instrument 100, an image of the content is displayed on the wearable display 140 under control of the presentation control section 118 of the portable electronic instrument 100.

When the user has returned home and removed the wearable display 140, an image of the content is displayed on the display 340 under control of the display control section 318 of the digital photo frame 300. For example, the information about the content selected by the content selection section 112 of the portable electronic instrument 100 is transferred to the digital photo frame 300 through the server 200 (e.g., home server), and downloaded to the content information storage section 322 of the storage section 320. The display control section 318 of the digital photo frame 300 displays an image of the content on the display 340 based on the content information transferred from the portable electronic instrument 100.

Alternatively, when the user has returned home and removed the wearable display 140, the robot 1 speaks the phrase included in the scenario data of the content to present the content to the user. For example, the information about the content selected by the content selection section 112 of the portable electronic instrument 100 is transferred to the robot 1 through the server 200, and downloaded to and stored in a content information storage section 422 of a storage section 420. Specifically, scenario data that includes a plurality of phrases is stored in the content information storage section 422. The robot 1 is caused to speak the phrase included in the scenario data and selected based on the usualness level of the user.

In FIG. 27, a processing section 402 of the robot 1 performs various processes necessary to operate the robot 1 based on sensor information from a robot-mounted sensor 410, the acquired user information, and the like. The function of the processing section 402 may be implemented by hardware such as a processor (e.g., CPU) or an ASIC (e.g., gate array), a program, or the like.

A robot control section 430 controls a robot motion mechanism 440 (e.g., actuator, sound output section, or LED). The function of the robot control section 430 may be implemented by hardware such as a robot control ASIC or a processor, a program, or the like.

The robot control section 430 causes the robot 1 to present the presentation information to the user. When the presentation information is presented by a conversation (scenario data) of the robot 1, the robot control section 430 causes the robot 1 to speak the phrase. For example, the robot control section 430 converts digital text data that indicates the phrase into an analog sound signal by a text-to-speech (TTS) process, and outputs the sound through a sound output section (speaker) of the robot motion mechanism 440. When the presentation information indicates the emotional state of the robot 1, the robot control section 430 controls an actuator of each joint mechanism of the robot motion mechanism 440, or causes the LED to be turned ON, for example.

The robot-mounted sensor 410 may be a touch sensor, a speech sensor (microphone), an imaging sensor (camera), or the like. The robot 1 can monitor the reaction of the user to the information presented to the user based on the sensor information from the robot-mounted sensor 410.

Note that the server 200 may estimate the state of the user, evaluate the usualness level, or select the content, or some of these processes may be performed by the digital photo frame 300 or the robot 1.

Although some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term (e.g., wearable sensor and wearable display) cited with a different term (e.g., sensor and display) having a broader meaning or the same meaning at least once in the specification and the drawings can be replaced by the different term in any place in the specification and the drawings. The configuration and the operation of the information processing system (information presentation system) are not limited to those described with reference to the above embodiments. Various modifications and variations may be made.

What is claimed is:

1. An information processing system comprising:
  a state estimation section that estimates a state of a user based on information that includes sensor information from at least one of a behavior sensor that measures a behavior of the user, a condition sensor that measures a condition of the user, and an environment sensor that measures an environment of the user;
  a historical information storage section that stores state historical information about the user;
  a usualness level evaluation section that evaluates a usualness level of the user; and
  a write section that writes the usualness level of the user evaluated by the usualness level evaluation section in the historical information storage section so that the usualness level is linked to each state of the user indicated by the state historical information about the user.

2. The information processing system as defined in claim 1, further comprising:
  a content information storage section that stores a plurality of contents; and
  a content selection section that selects a content presented to the user from the plurality of contents stored in the content information storage section based on the usualness level of the user linked to each state of the user indicated by the state historical information about the user.

3. The information processing system as defined in claim 2, the content selection section preferentially extracting the state of the user that is linked to a low usualness level from the state historical information stored in the historical information storage section, and selecting the content that corresponds to the extracted state of the user.

4. The information processing system as defined in claim 2, the content selection section preferentially extracting the state of the user that is linked to a high usualness level from the state historical information stored in the historical information storage section, and selecting the content that corresponds to the extracted state of the user.

5. An information processing system comprising:
  a state estimation section that estimates a state of a user based on information that includes sensor information from at least one of a behavior sensor that measures a behavior of the user, a condition sensor that measures a condition of the user, and an environment sensor that measures an environment of the user;
  a usualness level evaluation section that evaluates a usualness level of the user;
  a content information storage section that stores a plurality of contents; and
  a content selection section that selects a content presented to the user from the plurality of contents stored in the content information storage section based on the state of the user and the usualness level of the user.

6. The information processing system as defined in claim 2, the state estimation section predicting a future state of the user based on schedule information about the user; the usualness level evaluation section evaluating the usualness level of user with respect to the predicted future state of the user; and
the content selection section selecting the content presented to the user based on the usualness level of user with respect to the future state of the user.

7. The information processing system as defined in claim 2, further comprising:
a presentation control section that causes a robot to present the content selected by the content selection section to the user.

8. The information processing system as defined in claim 7, the content information storage section storing scenario data that includes a plurality of phrases as the content presented to the user; and
the presentation control section causing the robot to speak a phrase included in the scenario data selected as the content.

9. The information processing system as defined in claim 2, further comprising:
a presentation control section that presents the content selected by the content selection section to the user using a digital photo frame.

10. The information processing system as defined in claim 2, further comprising:
a presentation control section that presents the content selected by the content selection section to the user using a wearable display.

11. The information processing system as defined in claim 2,
the usualness level evaluation section evaluating a first usualness sublevel that is a usualness level evaluated based on a first evaluation target item, and evaluating a second usualness sublevel that is a usualness level evaluated based on a second evaluation target item that differs from the first evaluation target item, and
the content selection section selecting a content corresponding to the first evaluation target item when selecting a content based on the first usualness sublevel, and selecting a content corresponding to the second evaluation target item when selecting a content based on the second usualness sublevel.

12. The information processing system as defined in claim 11,
the first evaluation target item and the second evaluation target item including at least one of time information, place information about the user, behavior information about the user, condition information about the user, and schedule information about the user.

13. The information processing system as defined in claim 2,
the state estimation section specifying a place of stay of the user;
the usualness level evaluation section evaluating the usualness level of the user with respect to the place of stay of the user; and
the content selection section selecting the content based on the usualness level of the user with respect to the place of stay of the user.

14. The information processing system as defined in claim 13,
the state estimation section determining whether the user stays within an area or a spot, the spot being smaller than the area,
the usualness level evaluation section evaluating the usualness level of the user with respect to the area when the state estimation section has determined that the user stays within the area, and evaluating the usualness level of the user with respect to the spot when the state estimation section has determined that the user stays within the spot, and
the content selection section selecting the content based on the usualness level of the user with respect to the area when the state estimation section has determined that the user stays within the area, and selecting the content based on the usualness level of the user with respect to the spot when the state estimation section has determined that the user stays within the spot.

15. The information processing system as defined in claim 14,
the content selection section selecting the content preferentially based on the usualness level of the user with respect to the spot when the state estimation section has determined that the user stays within the spot within the area, and selecting the content based on the usualness level of the user with respect to the area when the state estimation section has determined that the user stays within a place within the area other than the spot.

16. The information processing system as defined in claim 14,
the state estimation section determining whether the user stays within the area or the spot based on a standard deviation of a position of the user within a given period.

17. The information processing system as defined in claim 16,
the state estimation section determining whether or not the user stays within the area based on whether or not the standard deviation of the position of the user within the given period is equal to or less than a given first threshold value, and determining whether or not the user stays within the spot based on whether or not the standard deviation of the position of the user within the given period is equal to or less than a given second threshold value, the given second threshold value being smaller than the first threshold value.

18. The information processing system as defined in claim 1,
the usualness level evaluation section evaluating the usualness level of the user based on the state of the user estimated by the state estimation section.

19. The information processing system as defined in claim 1,
the state estimation section including a state identification section and a state prediction section; and
the usualness level evaluation section evaluating the usualness level of the user by comparing a state of the user predicted by the state prediction section with an actual state of the user identified by the state identification section.

20. An information processing method comprising:
estimating a state of a user based on information that includes sensor information from at least one of a behavior sensor that measures a behavior of the user, a condition sensor that measures a condition of the user, and an environment sensor that measures an environment of the user;

storing state historical information about the user in a historical information storage section;

evaluating a usualness level of the user; and writing the usualness level of the user obtained by the evaluation in the historical information storage section so that the usualness level is linked to each state of the user indicated by the state historical information about the user.

21. An information processing method comprising:

estimating a state of a user based on information that includes sensor information from at least one of a behavior sensor that measures a behavior of the user, a condition sensor that measures a condition of the user, and an environment sensor that measures an environment of the user;

evaluating a usualness level of the user;

storing a plurality of contents in a content information storage section; and selecting a content presented to the user from the plurality of contents stored in the content information storage section based on the state of the user and the usualness level of the user.

22. A computer program product storing a program code that causes a computer to execute the information processing method as defined in claim 20.

23. A computer program product storing a program code that causes a computer to execute the information processing method as defined in claim 21.

* * * * *